US009179305B2

(12) United States Patent
Haddad et al.

(10) Patent No.: US 9,179,305 B2
(45) Date of Patent: Nov. 3, 2015

(54) BLOOM FILTER BASED DEVICE DISCOVERY

(75) Inventors: Wassim Haddad, Boulder, CO (US); Michaela Vanderveen, Tracy, CA (US); Georgios Tsirtsis, London (GB); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 12/482,827

(22) Filed: Jun. 11, 2009

(65) Prior Publication Data

US 2010/0318795 A1 Dec. 16, 2010

(51) Int. Cl.
G06F 21/00 (2013.01)
H04W 12/06 (2009.01)
G06F 21/31 (2013.01)

(52) U.S. Cl.
CPC ............. *H04W 12/06* (2013.01); *G06F 21/31* (2013.01)

(58) Field of Classification Search
CPC .............................. H04W 12/06; G06F 21/31
USPC ................ 370/342, 395, 335, 310, 328, 338; 455/410–411, 455, 41.2, 502, 151.2; 709/227–231, 237, 245; 380/247, 255, 380/277–286, 47; 726/3
See application file for complete search history.

(56) References Cited

U.S. PATENT DOCUMENTS

| 7,293,077 | B1 * | 11/2007 | Teo et al. ....................... 709/221 |
| 7,970,933 | B2 * | 6/2011 | Osano et al. ................... 709/242 |
| 2005/0108368 | A1 | 5/2005 | Mohan et al. |
| 2008/0229103 | A1 * | 9/2008 | Mutka et al. .................. 713/168 |
| 2009/0016248 | A1 | 1/2009 | Li et al. |
| 2009/0016255 | A1 * | 1/2009 | Park .............................. 370/312 |
| 2009/0016353 | A1 * | 1/2009 | Li et al. ....................... 370/395.3 |
| 2010/0303236 | A1 * | 12/2010 | Laaksonen et al. ........... 380/270 |

FOREIGN PATENT DOCUMENTS

| JP | 2009071531 A | * | 4/2009 |
| JP | 2010533428 A | | 10/2010 |
| JP | 2010535437 A | | 11/2010 |
| WO | 2009009355 A2 | | 1/2009 |
| WO | 2009009452 | | 1/2009 |

OTHER PUBLICATIONS

International Search Report and Written Opinion—PCT/US2010/038232, International Search Authority—Eurpean Patent Office—Sep. 30, 2010.
Taiwan Search Report—TW099119176—TIPO—Dec. 25, 2013.

* cited by examiner

Primary Examiner — Shewaye Gelagay
Assistant Examiner — Kendall Dolly
(74) Attorney, Agent, or Firm — Paul S. Holdaway

(57) ABSTRACT

Aspects describe enabling two peers that have already paired together under some circumstances to re-identify themselves under different circumstances so that the peers can bypass performing another pairing only to discover that they are already paired. A Bloom filter is constructed from an available pool of locally selected identifiers and is sent to a peer node in a first message. Upon receiving the message with the Bloom filter, peer node checks all its known identifiers. If peer node finds that one of its identifiers is a member of the Bloom filter, peer node sends a reply in order to achieve a mutual identification.

49 Claims, 13 Drawing Sheets

BLOOM FILTER BASED DEVICE DISCOVERY

BACKGROUND

I. Field

The following description relates generally to discovery in communication networks and more particularly to a discovery mechanism between connected peer devices.

II. Background

Wireless communication systems or networks are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station, access point, or access router. The access point covers a geographic range or cell and, as the mobile device is operated, it may be moved in and out of these geographic cells.

Some networks can be constructed utilizing solely peer-to-peer communication without utilizing base stations, access points, or access routers. Such networks are sometimes referred to as ad hoc networks. Communication in such networks may, in some cases, be limited to exchanges between devices that are within direct wireless transmission range of each other, while in other cases multi-hop forwarding between non-adjacent devices may be supported. Various techniques may be used to maintain connectivity and/or forwarding information as the topology of the network changes (e.g., as devices join, leave, or move). Some networks can also be constructed utilizing a combination of both peer-to-peer devices as well as base stations, access points, or access routers.

In large scale mobile wireless networks, particularly a network that includes peer-to-peer communication, a device may frequently come within transmission range of other devices (e.g., the set of potential communication peers over time is large). Some of these other devices might be devices with which a pairing has already been established. However, there may be a subset of other devices with which a pairing has not been previously established. Due to the nature of the pairings, it is difficult for devices to know whether or not a pairing has been established there between. Therefore, in conventional communication systems, a new pairing is automatically established irrespective of whether a previous (unknown) pairing is already available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with Bloom filter based device discovery. A Bloom filter is constructed by a node from at least a subset of available local pairing identifiers (e.g., Security Parameter Index (SPI)). The Bloom filter is sent to a peer node in a first message. In accordance with some aspects, Bloom filter can be sent in an option carried in the first message. At substantially the same time as receiving the message with the Bloom filter, the peer node checks all its identifiers. If the peer node finds a identifier that is a member of the Bloom Filter, the peer node sends back a reply to achieve a mutual identification. Data exchange can occur after the mutual identification is verified. If the peer node does not find a pairing identifier and/or if mutual identification cannot be verified, a new pairing can be established.

An aspect relates to a method performed by a first node in a communication network. Method includes processing one or more selected identifiers through a filter to produce a bit vector. Each selected identifier is a subset of a pairing. Method also includes inserting the bit vector in a first message and transmitting to a second node the first message. Further, method includes receiving from the second node a second message. The second message comprises a packet and indicates a match to one of the selected identifiers. The match represents a potential pairing relationship between first node and second node. Method can employ a processor to implement the various acts associated with the method.

Another aspect relates to a communications apparatus comprising a memory and a processor. The memory retains instructions related to processing a subset of identifiers through a hash operation to obtain a bit vector and sending to a peer node the bit vector in a message. The memory also retains instructions related to receiving a reply that includes a packet and an identifier that corresponds to one of the subset of identifiers indicated in the bit vector. Further, memory retains instructions related to exchanging data with the peer node if the packet is successfully decoded. The processor is coupled to the memory and is configured to execute the instructions retained in the memory.

A further aspect relates to a communication apparatus that processes known pairing identifiers through a filter mechanism in an ad hoc network. Apparatus includes means for processing a subset of pairing identifiers through a filter mechanism that outputs a bit vector. Marked bits of the bit vector correspond to the subset of pairing identifiers. Also included in apparatus is means for conveying a first message to a peer node. The first message includes the bit vector. Apparatus also includes means for receiving from the peer node a second message that includes one of the pairing identifiers and the corresponding pairing identifier and means for decrypting the packet utilizing a security association that is referred to in the second message. Further, apparatus includes means for exchanging data with the peer node if the packet was decrypted successfully.

Yet another aspect relates to a computer program product comprising a computer-readable medium. The computer-readable medium includes a first set of codes for causing a computer to process one or more pairing identifiers through a filter to produce a bit vector and a second set of codes for causing the computer to insert the bit vector in a first message. Also included in computer-readable medium is a third set of codes for causing the computer to transmit to the peer node the first message and a fourth set of codes for causing the computer to receive from the peer node a second message. The second message comprises a packet and indicates an identifier of the peer node that is matched to one of the pairing identifiers represented by the bit vector. Further, computer-readable medium includes a fifth set of codes for causing the computer to decode the packet and a sixth set of codes for causing the computer to exchange data with the peer node if the packet is decoded successfully.

Still a further aspect relates to at least one processor configured to utilize a filter mechanism. Processor includes a first module for processing a subset of pairing identifiers through a filtering mechanism to obtain a bit vector and a second module for sending to a peer node the bit vector in a message. Processor also includes a third module for receiving a reply that includes a packet and an identifier that corresponds to one of the subset of pairing identifiers included in the bit vector and a fourth module for exchanging data with the peer node if the packet is successfully decoded.

Another aspect relates to a method performed by a communication device for identifying a preexisting pairing relationship. Method includes receiving from a peer node a first message that comprises a bit vector. The bit vector indicates at least one identifier associated with a pairing relationship. Method also includes evaluating the first message against a plurality of identifiers associated with pairing relationships of the communication device to ascertain if one of the communication device identifiers matches the peer node identifier indicated in the bit vector. Method also includes transmitting to the peer node a second message that includes the matched communication device identifier and the identifier received in the bit vector. Method can employ a processor to implement the various acts associated with the method.

Still another aspect relates to a communication apparatus that includes a memory and a processor. Memory retains instructions related to receiving a bit vector in a message from a peer node and determining which bits in the bit vector would be set if the message included pairing identifiers known by communication apparatus. Memory also retains instructions related to matching the set bits to pairing identifiers known by the communication apparatus and sending a reply message that includes the matched pairing identifier if the bits were set. Further, memory retains instructions related to exchanging data with the peer node. Processor is coupled to the memory and is configured to execute the instructions retained in the memory.

Another aspect relates to a communications apparatus that utilizes a bit vector. Apparatus includes means for receiving a first message that includes a bit vector that indicates pairing identifiers of a peer node and means for identifying bits that should be activated in the bit vector if one of the pairing identifiers matches a pairing identifier known by communications apparatus. Apparatus also includes means for determining there is a match between one of the pairing identifiers indicated in the bit vector and the pairing identifier known by communications apparatus. Also included in apparatus is means for sending to the peer node a second message that includes the pairing identifier indicated in the bit vector in an unencrypted portion of the second message and the pairing identifier known by the communication device in an encrypted portion of the second message. Further, apparatus includes means for exchanging data with the peer node.

Yet another aspect relates to a computer program product comprising a computer-readable medium. The computer-readable medium includes a first set of codes for causing a computer to receive from a peer node a first message that comprises a bit vector. The bit vector indicates identifiers associated with a pairing relationship. Computer-readable medium also includes a second set of codes for causing the computer to evaluate the first message against a plurality of known pairing identifiers to ascertain if a known identifier matches one of the identifiers indicated in the bit vector. Further, apparatus includes a third set of codes for causing the computer to transmit to peer node a second message that includes the matched known pairing identifier and the identifier indicated in the bit vector and a fourth set of codes for causing the computer to exchange data with peer node.

Still another aspect relates to at least one processor configured to perform discovery in a peer-to-peer communication network. Processor includes a first module for receiving a bit vector in a message from a peer node and a second module for determining which bits in the bit vector would be set if the message included an identifier of an existing pairing relationship with the peer node. Processor also includes a third module for matching the set bits to pairing identifiers and a fourth module for sending a reply message that includes the matched known pairing identifier if the bits were set. Further, processor includes a fifth module for exchanging data with peer node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
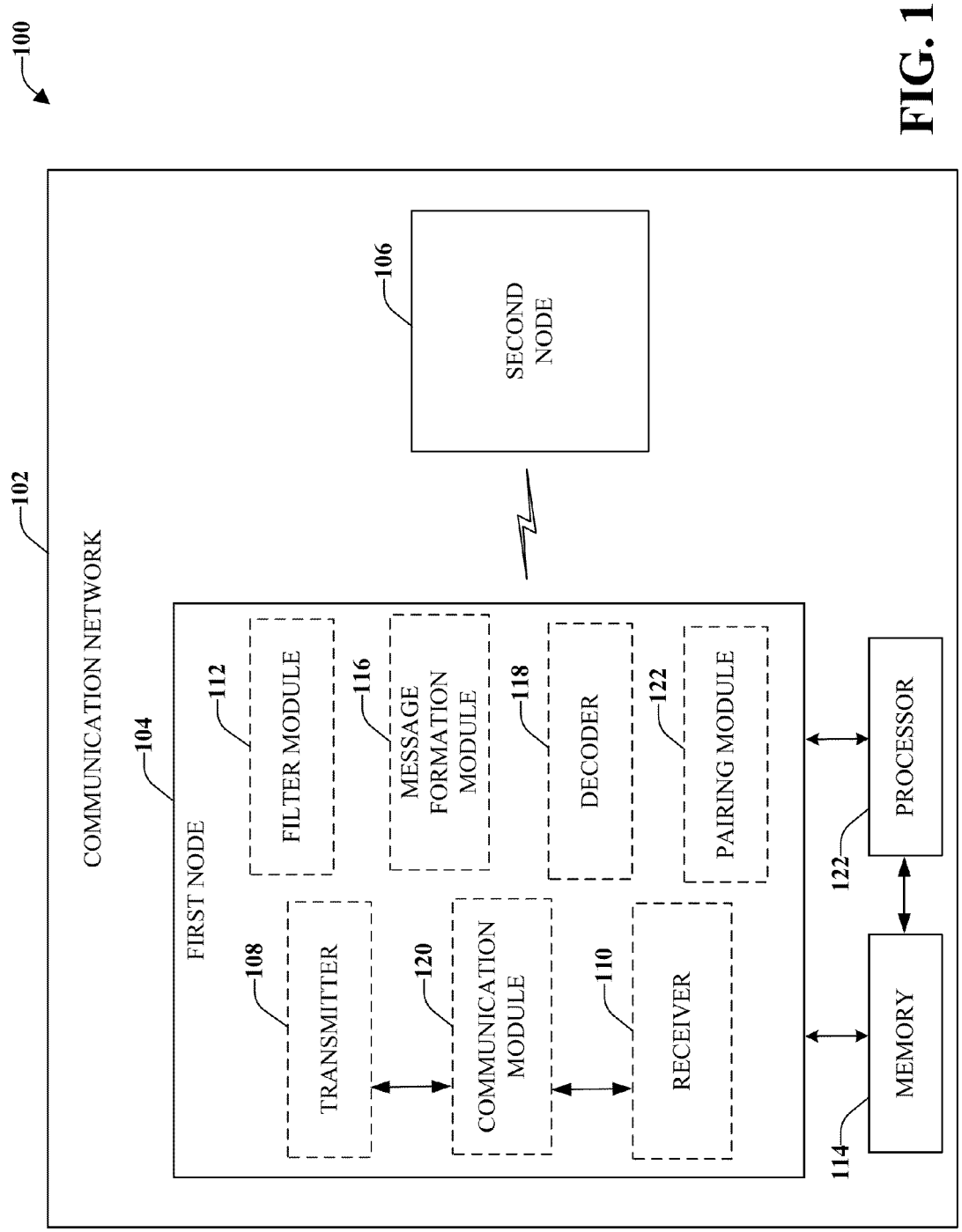
FIG. 1 illustrates a system configured to enable a light-weight discovery mechanism between connected peers, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules and so on, discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1 illustrated is a system 100 configured to enable a lightweight discovery mechanism between connected peers, according to an aspect. The connected peers, sometimes referred to as nodes, are communication devices. System 100 is configured to enable two peers, which have already communicatively paired together under a first set of circumstances to re-identify themselves under different circumstances. Thus, peer nodes can attempt to mitigate the need to perform another pairing only to discover that they are already paired.

System 100 includes a communication network 102, which can be a peer-to-peer network. Included in network 102 is a communication apparatus 104 (sometimes referred to as first node) that communicates with a peer communication apparatus 106 (sometimes referred to as second node or peer node). Although a number of nodes can be included in communication network 102, as will be appreciated, a single node 104 that transmits communication data signals to another node 106 is illustrated for purposes of simplicity.

Communication systems establish secure relationships (or pairings) between devices (e.g., nodes 104 and 106). A pairing is commonly referred to as including both a protocol and the material resulting from the protocol, which is a means for two nodes to associate themselves with each other and derive a shared secret key to be used for all future communication. These pairings are typically valid for a certain interval of time and, during this interval, the nodes are able to communicate securely with each other. Due to computationally heavy operations typically involved in establishing these pairings, it is beneficial if the pairing can be reused for a number of communication sessions between nodes 104, 106.

Further, in some systems, when a pairing is established, nodes 104, 106 identify each other (or their pairing relationship) by a unique identifier (e.g., a Security Parameter Index (SPI), a Device Identifier, or other appropriate identifier). Devices are commonly identified by Device IDs. However, pairing (e.g., relationships) are defined by SPIs. A combination of Device IDs and SPIs is also possible. Thus, a single device can have only one Device ID but can have many SPIs depending on the number of peer devices with which the single device has current pairings.

The next time the devices are within communication range of each other, and assuming an exchange of data is desired, the devices exchange their identifiers to determine if they already have a pairing established. If the pairing was already established, the pairing procedures can be bypassed. However, a problem with this conventional approach is that the identifier used to identify each device is not pairing specific but is device specific. It is not pairing specific since the devices do not know which pairing identifier to use when meeting a new device. Further, since it is device specific, it allows the other device to search its local state for that device identifier and find a pairing if a pairing exists. In some situations, use of a device identifier, which is typically sent in the clear (e.g., not encrypted) can allow third parties to track devices, introducing security concerns. Sometimes, these device identifiers can be transmitted over an encrypted pipe (e.g., by performing Diffie-Hellman or another procedure first), but this is computationally expensive. Alternatively or additionally, a device can send a list of all of its current pairing identifiers (e.g., SPIs), however, the list can be very large which would result in large messages as well as exposing sensitive information. In accordance with various aspects presented herein, a mechanism is provided that has the advantage of allowing devices to discover whether they have a pairing without having to create a secure pipe and without exposing traceable identifiers.

First node 104 includes a transmitter 108 that is configured to send messages to second node 106. In accordance with some aspects, an initial communication exchange between the nodes 104, 106 is a paging request/response exchange. According to some aspects, this exchange may contain application-layer identifiers. For the initial communication exchange, first node 104 sends a message, such as a paging request message. A receiver 110 of first node 104 is configured to receive a reply message, from second node 106, which is a reply to the paging request message. It should be noted that first node 104 and second node 106 have already established a pairing. However, at this point (after the paging request/response exchange), first node 104 does not know the identity of second node 106. Therefore, the nodes 104, 106 do not know if a pairing has previously been established between the nodes or whether a pairing needs to be established between the nodes.

In order to determine whether or not there is a previous pairing that can be utilized, a filter module 112 is configured to construct a filter that includes, as inputs, pairing identifiers of first node 104, which can be Security Parameter Indexes (SPIs), device identifiers, or another identifiers. The pairing identifiers can be maintained in a memory 114 or other storage medium and, as needed, the pairing identifiers are retrieved from the storage medium. The pairing identifiers are inputs to the filter and the output of the filter is a bit vector. According to some aspects, a hash operation or multiple hash operations are performed on the inputs (e.g., pairing identifiers) to derive the output bit vector.

The bit vector can include a number of bits (e.g., 128 or 256 bits) and, depending on the length of the input (e.g., the amount of pairing identifiers selected for input into the filter) a subset of the bits in the bit vector are activated (e.g., set to "1") while the remaining bits are not activated (e.g., set to "0"). In some communication systems, it is desired to keep the length of the output bit vector relatively short, even though some devices may be able to handle large vectors. In order to keep the output bit vector short (e.g., a minimal number of bits), only a subset of the pairing identifiers retained by first node 104 might be used as inputs for the filter calculation.

There can be various criteria taken into account by filter module 112 when constructing the filter, which can be a function of the filter accuracy (e.g., false positive rate). For example, the selected pairing identifiers used as inputs for the filter construction might be all the pairing identifiers known by first node 104 (e.g., all pairing identifiers retained in storage media). In accordance with some aspects, the pairing identifiers selected for inclusion in the filter construction might be only the most recent pairing identifiers. For example, the most recent pairing identifiers might be the pairing identifiers that have been utilized and/or created in a specific time period (e.g., the last three hours, the last two days, and so forth). According to some aspects, the pairing identifiers selected for inclusion in the construction of the filter might be active pairing identifiers (e.g., where a child SA (Security Association) is still valid). However, other considerations can be taken into account by filter module 112 when determining which pairing identifiers to select for use as inputs to the filter (e.g., manual input from the user, user preferences, policies, rules, and so forth).

In accordance with some aspects, filter module 112 utilizes a Bloom filter to create the output bit vector. Bloom filters provide a certain probability of false positives, depending on the number of inputs and length of the output (bloom filter vector). The output of a Bloom filter is a data structure that enables a probabilistic determination of whether an element is a member of the input set. While false positives can occur with a Bloom filter (e.g., a node appears to be a related peer when it is not), false negatives cannot occur with a Bloom filter. False positives can occur when first node 104, associated with an identifier, turns on (e.g., sets to "1") a similar subset of bits that would be set by another identifier or a multitude of other identifiers. In this case, the Bloom filter output is the same as if it were generated from a different set of identifiers.

The bits set to "1" correspond with an output that represents one or more of the identifiers used as input to the filtering mechanism. The bit vector can be advertised (e.g., over broadcast, multicast, and/or unicast transmission) periodically (or sent at different intervals or upon request) by first node 104 for the purpose of peer discovery. Second node 106 can determine whether the bit vector includes any known identifiers by performing a similar operation (e.g., processing a known identifier through a combining or filtering mechanism) and determining the bits in a bit vector that should be set to "1" if a peer with which a pairing has already been established is broadcasting the bit vector. Second node 106 does not have to be aware of all identifiers used as input to the filter, just the one or more identifiers known by second node 106. Further information related to Bloom filters will be provided below.

After the filter is constructed by filter module 112, a message formation module 116 is configured to insert the output bit vector (or Bloom filter) in a first message that is to be conveyed to second node 106. According to some aspects, the bit vector can be included in an option of the first message. If second node 106 obtains a match to at least one of the selected pairing identifiers in the bit vector, a second message (in reply to the first message) will be received, at receiver 110.

The second message from second node 106 can be decrypted by a decoder 118. According to some aspects, the second message comprises an unencrypted portion and an encrypted portion. The unencrypted portion comprises an identifier (supplied by second node 106) and the encrypted portion comprises a corresponding (or in some aspects the same) identifier (selected by first node 104). In order to decode the second message, decoder 118 can utilize a corresponding Security Association (SA) key. The corresponding SA key is associated uniquely with the potential pairing between the nodes, as identified by the following pair of identifiers: the identifier supplied by second node 106, as well as the identifier (selected by first node 104) that was matched in the first message. These two identifiers may have the same value. The decryption allows first node 104 to verify whether the decrypted identifier (or security parameter index) corresponds to the correct Security Association. If the decrypted identifier (or security parameter index) is valid, then data exchange with second node 106 can proceed though utilization of a communication module 120, which is operatively connected to transmitter 108 and receiver 110.

By way of example, the pair of two identifiers can be used by node 104 and the same pair of two identifiers is used by node 106 to send in the clear and also to send encrypted. For example, the SPI can be formed by two values. One value is locally-selected and the other value is selected by the other party (node) during pairing (Local_ID, Remote_ID). First node sends a filter of all of its pairs (Local_ID, Remote_ID). Peer node performs a match with the two IDs (local and remote) switched, because, in peer node's database is retained pairs (locally_selected, remote_selected).

In accordance with some aspects, an unencrypted portion of second message can include the identifier of first node 104 and the encrypted portion can include the identifier of second node 106. The determination of which identifier is in the encrypted and unencrypted portions is established in advance (e.g., by system configuration). According to some aspects, the encrypted portion can include other information, such as a time stamp.

If the decoding reveals that the pairing is a false positive (e.g., the decrypted SPI is not valid), this re-connection mechanism fails. In this case, first node 104 discards the second message and a pairing module 122 reverts to establishing a new pairing with second node 106, though a secure protocol such as Diffie-Hellman.

In accordance with some aspects, second node 106 might not recognize any of the identifiers identified in the bit vector (e.g., no identifiers of second node 106 or its pairings resulted in a match into the bit vector). In this case, first node 104 will receive (through receiver 110) a request to create a secure link. Pairing module 120 will proceed to establish a new pairing with second node 106 (e.g., by performing a Diffie-Hellman protocol or another procedure).

According to some aspects, filter module 112 can construct a Bloom filter at about the same time as one or more security parameter indices are available. This Bloom filter can be recomputed around the same time as a new security parameter index is generated or an old security parameter index is deleted. In this manner, the bit vector is ready to be sent when needed. In accordance with some aspects, to accelerate the membership query (e.g., on the second node 106 side) each time a security parameter index is created, second node 106 hashes the security parameter index and stores the hash value. Further, some nodes do not have a high number of security parameter indexes, which automatically places limits on the number of inputs to a bit vector.

Memory 114 can be operatively coupled to first node 104. Memory 114 can be external to first node 104 or can reside within first node 104. Memory 114 can store information related to processing a subset of pairing identifiers through one or more hash operations to obtain a bit vector and sending, to a peer node, the bit vector in a message. Further, memory 114 can store instructions related to receiving a reply that includes a packet and a pairing identifier that corresponds to one of the subset of pairing identifiers indicated in the bit vector, and exchanging data with peer node if the packet is successfully decoded. Further, memory 114 can store other suitable information related to signals transmitted and received in a communication network. A processor 122 can be operatively connected to first node 104 (and/or memory 114) to facilitate analysis of information related to discovery in a communication network. Processor 122 can be a processor dedicated to analyzing and/or generating information received by first node 104, a processor that controls one or more components of system 100, and/or a processor that both analyzes and generates information received by first node 104 and controls one or more components of system 100.

Memory 114 can store protocols associated with peer discovery and taking action to control communication between first node 104 and second node 106, and so forth, such that system 100 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 2:
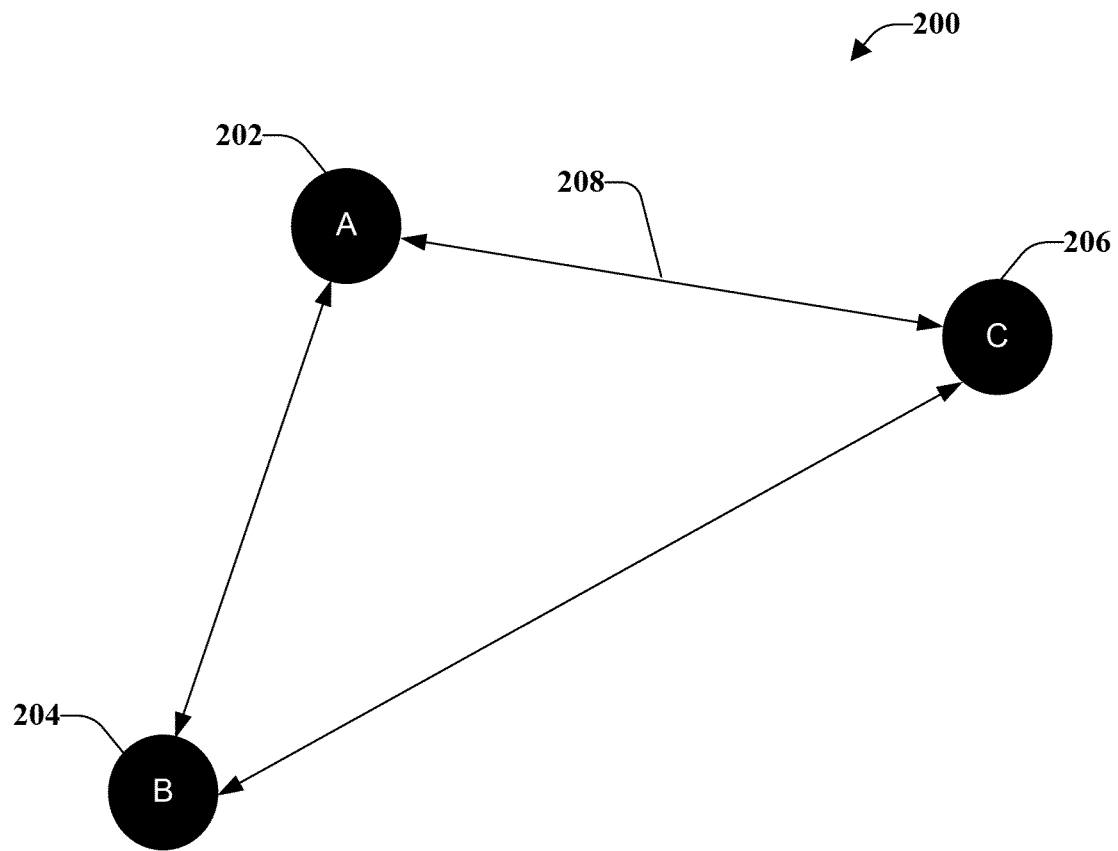
FIG. 2 illustrates an exemplary schematic representation of nodes in a communication network, according to an aspect.

FIG. 2 illustrates an exemplary schematic representation 200 of nodes in a communication network, according to an aspect. Illustrated are three devices, Device A 202, Device B 204, and Device C 206, which are peer devices that have already established a connection (e.g., pairing) with each other. Thus, Device A 202 has security associations with Devices B 204 and C 206. Further, Device B 204 has a security association with Device C 206. Each security association (SA) is identified by a security parameter index (SPI). Further, the security associations are unidirectional but may be bidirectional in accordance with some aspects. In the unidirectional case, therefore, another security parameter index is utilized to identify a security association in the opposite direction (e.g., between Device C 206 and Device B 204). For example, the link 208 from device A 202 to Device C 206 has a security association, $SA_{A \rightarrow C}$, which corresponds to a security parameter index $SPI_{AC}$. Further, the link 208 from Device C 206 to Device A has a separate security association, $SAC_{C \rightarrow A}$, which corresponds to a security parameter index $SPI_{CA}$.

Continuing this example, at some point in time, Device C 206 pages or queries for an application called "kbattleship" (for example) and receives a response from Device A 202. However, "kbattleship" is an application that can be present on many devices and thus, does not have a single owner. Therefore, after paging, Device C 206 does not know if the responder was Device A 202, Device B 204, or another device with no existing pairing with Device C 206. In according with traditional systems, the next step is for Device C 206 to trigger a new pairing with the unknown device (e.g., Device A 202).

However, in accordance with this example, Device C 206 already has established a valid pairing with Device A 202. Therefore, in accordance with the disclosed aspects, Device A 202 and/or Device C 206 can be provided an indication whether or not there is an already established pairing between the devices. If there is a pairing already established, the devices can utilize the existing pairing instead of trying to establish a new pairing.

According to some aspects, if first node 104 (of FIG. 1) has a high number of security parameter indexes and to mitigate a high rate of false positives, filter module 112 can construct the filter by randomly (or pseudo-randomly) selecting a maximum allowed number of security parameter indexes to be used as input to the filter. In accordance with some aspects, second node 106 can refrain from running Diffie-Hellman until second node 106 receives the next message from first node 104.

In accordance with some aspects, each node 104, 106 expresses its current favorite activities (e.g., gaming) in the message exchange so that a Bloom filter (or other filter) can be constructed only from security parameter indexes tagged with "gaming".

The disclosed aspects provide advantages over conventional techniques. For example, some techniques utilize "temporary device identifiers". However, these temporary identifiers make the device traceable to nearby eavesdroppers, for at least a limited amount of time. Other techniques utilize temporary physical layer channel identifiers, however, this can cause a layer violation. Some other techniques run Diffie-Hellman and then wait until receiving peer node's certificate or device identifier to verify if peer node is known or is not known. Diffie-Hellman can solve the problem without disclosing any identifiers and, further, does not rely on any additional parameters. However, Diffie-Hellman is an expensive operation.

To overcome the problems associated with the above techniques, with the disclosed aspects, it can be almost impossible to efficiently and securely discover the identities of the communicating peers. Further, nodes that are already associated with each other are usually not concerned about tracking, since the nodes are already associated (e.g., the nodes can send a discovery ping message at anytime).

Figure 3:
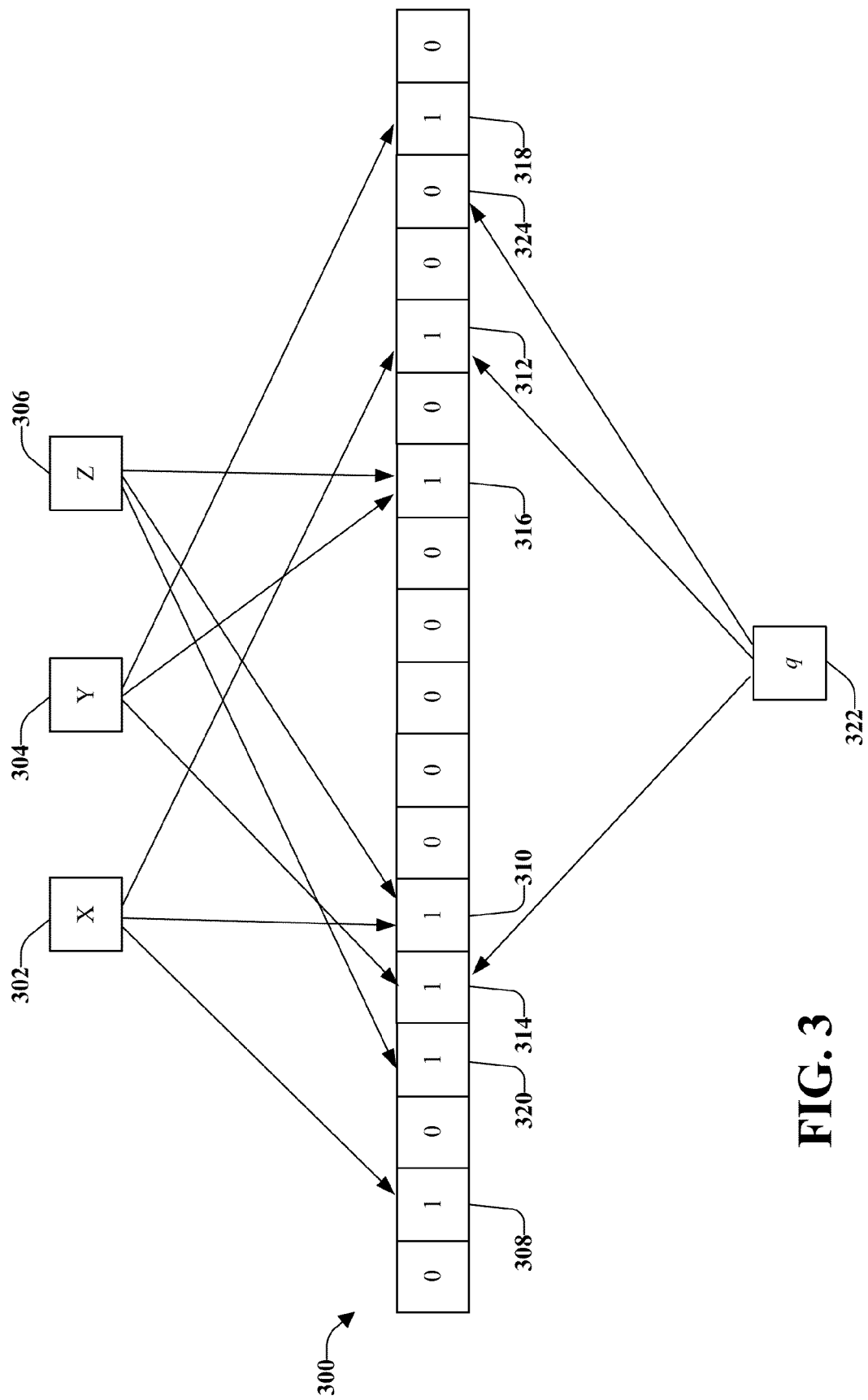
FIG. 3 illustrates a conceptual illustration of a bit vector output computed from a set of identifiers, which were used as input to a Bloom filter in accordance with one or more aspects.

To fully appreciate the disclosed aspects, FIG. 3 illustrates a conceptual illustration of a bit vector output 300 computing from a set of identifiers, where pairing identifiers were used as input to a Bloom filter in accordance with one or more aspects. A Bloom filter is a randomized data structure that allows for compact representation of a set $A=\{a_1, a_2, \ldots, a_n\}$, using a m-bit vector (called Bloom Filter), and supports membership queries. The procedure can utilize K uniform and independent hash functions $h_1( ), h_2( ), \ldots, (h_K)$, where $1 \leq h_1( ) \leq m$. First, all m bits of the vector are set to zero. Then for each element $a_i \in A$, the bit positions $h_1(a), h_2(a), \ldots, h_K(a)$ are set to "1".

The illustrated bit vector output 300 represents the set $\{x, y, z\}$ in an m-bit vector, with m=18. However, it should be understood that a different number of inputs can be utilized with the disclosed aspects. Further, a different size bit vector output can be utilized.

As illustrated, the output of the Bloom Filter Module is a bit vector. A subset of bits within the bit vector correspond to each of the input elements or keys (e.g., identifiers) is marked (e.g., set to "1"). The marked bits are a function of the filter mechanism and the one or more algorithms used by the filter module (or other filter mechanism). For example, if an identifier is to produce three bits as an output (although another number of bits can be used), the input can be processed through three different hashes. Thus, each hash can choose a bit to turn on or activate (e.g., set to "1").

For example, as illustrated there are three components to the input set, specifically, x 302, y 304, and z 306. Input x 302 is mapped to (e.g., marks, turns "on", or sets to "1") three different bits in the bit vector, labeled at 308, 310, and 312. Input y 304 is mapped to bits labeled at 314, 316, and 318. Further, input z 306 is mapped to bits 310, 316, and 320, in this example. Note that bit 316, though activated two different times, remains set to "1". Element q 322, which is not in the set ($\{x, y, z\}$) is mapped to bits 312, 314, and 324. However, element q 322 is detected as a nonmember since it is mapped to a position (bit 324) containing a "0".

In order to check whether an element b (e.g., an SPI) $\in A$, the bit positions $h_1(b), h_2(b), \ldots h_K(b)$ of the Bloom filter are checked. If any of the bit positions is zero, then b is not an element of A. It should be noted that while there is a small probability of false positive, such probability can be minimized (e.g., depends on the size of the vector and the number of SPIs to be represented). Further, based on the structure of a Bloom filter, it is not possible that an existing SPI related to a first node (e.g., node 104 of FIG. 1) is not detected by a peer node (e.g., node 106 of FIG. 1), assuming a perfect or error-correctable communication channel.

In accordance with some aspects, a first node can take into account the number of bits that will be activated (e.g., set to "1"), which is a function of the number of inputs. Therefore, the amount of inputs to a Bloom filter might be limited as a function of a total number of bits that should be activated in the bit filter. For example, a bit vector might include a certain number of bits (e.g., 32, 64, and so forth) and, therefore, a maximum number of bits that can be set to "1" (e.g., upper bound, threshold level) can be predetermined to mitigate false positives (e.g., too many bits set to "1" such that it appears to have resulted from a large number of identifiers selected for input). In such cases, if an output of the filtering mechanism would result in more than the predetermined number of allowed marked bits (e.g., set to "1"), the first node can reduce the number of identifiers used as inputs.

Using a Bloom filter can enable two peers to recognize a shared pairing without leaking any information that allows an eavesdropper to trace the peers or their pairings. Further, the only nodes that can perform the tracing are the nodes that are associated (e.g., with first node 104). However, for these nodes, first node can be known to be located in the same area. Further, a reason that clear text link-layer packet identifiers/addresses are not used instead of the security parameter indexes is to make it difficult for any eavesdropper to correlate between such link layer identifiers, which may appear as a member of the filter.

Figure 4:
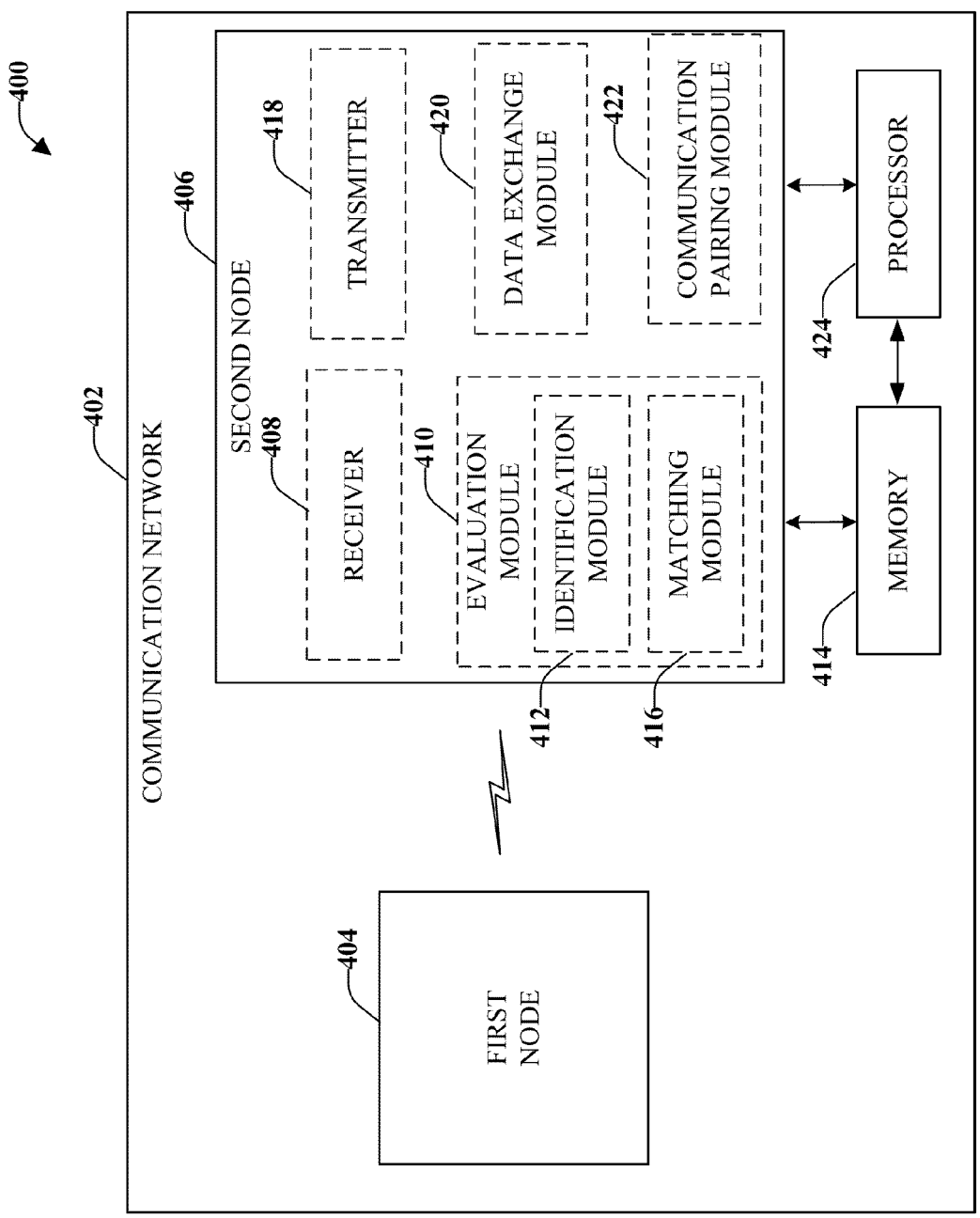
FIG. 4 illustrates a system for utilizing a filtering mechanism for peer based discovery, according to an aspect.

With reference now to FIG. 4, illustrated is a system 400 for utilizing a filtering mechanism for peer based discovery, according to an aspect. System 400 utilizes a lightweight mechanism, which allows two connected peers (that have already established a pairing) to discover each other following a paging request/response exchange related to a particular type of application/service. In conventional systems, a (secure) discovery or association protocol is relied upon for peer node to learn the first node's identity (e.g., from a certificate sent in a message).

System 400, however, utilizes a mechanism that enables two peers to discover each other before running a Diffie-Hellman procedure. Thus, if the discovery is successful, the two peers are already paired and the Diffie-Hellman procedure can be skipped. However, if the discovery procedure disclosed herein fails for any reason (e.g., the nodes were not previously paired, the identifiers used as input to the filter were not identified by peer node, and so forth), than the pairing protocol can be triggered. Furthermore, the disclosed aspects are built on top of the pairing protocol and thus, provide the advantage that the disclosed aspects do not need any new signaling messages.

System 400 includes a communication network 402, which can be a peer-to-peer network. Included in network is a communication apparatus 404 (sometimes referred to as a first node) that communicates with a peer communication apparatus 406 (sometimes referred to as second node). Although a number of nodes 404, 406 can be included in communication network 402, as will be appreciated, a single node 404 that transmits communication data signals to another node 406 is illustrated for purposes of simplicity.

For the following description, first node 404 and second node 406 have previously established a communication pairing and have a security parameter index, which is an identifier of the relationship (or link, not necessarily a physical layer active link) between the nodes 404, 406. The security parameter index can be thought of as a pair of identifiers. For example, one node (e.g., node 404) chooses identifier "23" and the other node (e.g., node 406) chooses identifier "45", thus the security parameter index is the pair ("23, 45"). Each node may store such pairs in the order "local, remote" (e.g., node 404 stores (23, 45), while node 406 stores (45, 23). This security parameter index identifies the security keys that will be used by nodes 404, 406, the lifetime of the pairing, the identifiers, and so forth. This information is retained in the local cache of each node 404, 406. Even though the message is originated when the association is established (e.g., "23, 45" is located in the message header), nodes 404, 406 might move away from each other or lose the connection. However, the information associated with the pairing is kept in the respective local caches (with the actual security keys). For example, first node 404 retains the identification of second node 406 and the lifetime of the pairing. However, the next time nodes 404, 406 encounter each other and wish to reestablish a connection, nodes 404, 406 might not recognize each other (e.g., the pairing is not readily identified). Thus, the disclosed aspects allow nodes 404, 406 to exchange information and more quickly determine if there was a previous pairing that can be utilized, which can mitigate the need to process a new (unneeded) pairing.

Included in second node 406 is a receiver 408 that is configured to receive, from first node 404, a first message that comprises a bit vector. The bit vector indicates identifiers, selected by and associated with pairing relationships of first node 404. In accordance with some aspects, the bit vector is an output of a Bloom filter and the input of the Bloom filer is a subset of selected identifiers associated with pairing relationships of first node 404. According to some aspects, a paging request/response exchange occurs between first node 404 and second node 406 before the first message is received at second node 406.

Also included in second node 406 is an evaluation module 410 that is configured to evaluate the bit vector included in first message. Evaluation module 410 determines whether there is a match between identifiers of second node 406 and the identifiers characterized by the bit vector. Included in evaluation module 410 can be an identification module 412 that is configured to compare the active bits in the bit vector against a plurality of identifiers of second node 406, retained in a memory 414 or other storage media of second node 406. A matching module 416 can determine which bits should be set to "1" in the bit vector by utilizing a similar filter operation as the operation performed by first node 404 when creating the bit vector. If the expected bits are set to "1", it indicates that an identifier (of second node 406) matches one of the identifiers of the bit vector.

If there is a match found, a transmitter 418, associated with second node 406, sends to first node 404 a second message that includes the matched identifier (of second node 406) and the identifier represented in the bit vector. Upon successful decoding of the second message by first node 404, second node 406 can exchange data with first node 404 though a data exchange module 420.

In accordance with some aspects, second message includes an unencrypted portion and an encrypted portion. The unencrypted portion includes the identifier (of second node 406) and the encrypted portion includes the identifier identified in the bit vector (e.g., selected by first node 404). According to other aspects, the unencrypted portion includes the identifier of first node 404 (identified in the bit vector) and the encrypted portion includes the identifier of second node 406.

By way of example and not limitation, a pairing can be identified as (SPI-I, SPI-R). First node 404 selected SPI-I and sends that identifier (SPI-I) with other identifiers selected for input to a filter (e.g., Bloom filter) and conveys the output of the filter in a first message. Second node 406 (which had chosen SPI-R), finds a match with second node's local SPI-A copy. At this point, second node 406 is aware of both SPI-I and SPI-R. According to some aspects, second node 406 can send SPI-I cleartext and SPI-R encrypted or, according to other aspects, can send SPI-R cleartext and SPI-I encrypted. The determination of which identifier to send cleartext might have been previously established (e.g., system configuration). First node 404, after receiving second message, is able to determine if the correct (matching) half of the SPI pair has been received.

In accordance with some aspects, first node 404 sends both SPI-I and SPI-R as input to the Bloom filter. Second node 406 finds a match to both of these (SPI-I and SPI-R). Second node 406 can then send SPI-I encrypted or, in accordance with some aspects, can send SPI-I in the clear. According to some aspects, second node 406 can send SPI-I and SPI-R in the clear and/or encrypted.

According to some aspects, the encrypted quantity can include other information (e.g., a time stamp). This can mitigate the chances that another device can eavesdrop and record what the SPI-SPI combination looks like encrypted and replay that information later.

If there is not a match found between one of the identifiers selected by first node 404 and one of the identifiers of second node 406, the second message can include a request to create a new pairing with first node 404. The new pairing can be facilitated through a communication pairing module 422. For example, if first node 404 and second node 406 did not have a previous pairing relationship, there would not be a match found.

Memory 414 can be operatively coupled to second node 406. Memory 414 can be external to second node 406 or can reside within second node 406. Memory 414 can store information related to receiving from a peer node a first message that comprises a bit vector and evaluating the first message against a plurality of pairing identifiers to ascertain if a pairing identifier matches an identifier of peer node indicated in the bit vector. Further, memory 414 can retain instructions relates to transmitting to peer node a second message that includes the matched pairing identifier and the identifier indicated in the bit vector and exchanging data with peer node. Memory 414 can also store other suitable information related to signals transmitted and received in a communication network. Memory 414 can store protocols associated with peer discovery taking action to control communication between first node 404 and second node 406, and so forth, such that system 400 can employ stored protocols and/or algorithms to achieve improved communications in a wireless network as described herein.

A processor 424 can be operatively connected to second node 406 (and/or memory 414) to facilitate analysis of information related to peer discovery in a communication network. Processor 424 can be a processor dedicated to analyzing and/or generating information received by second node 406, a processor that controls one or more components of system 400, and/or a processor that both analyzes and generates information received by second node 406 and controls one or more components of system 400.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
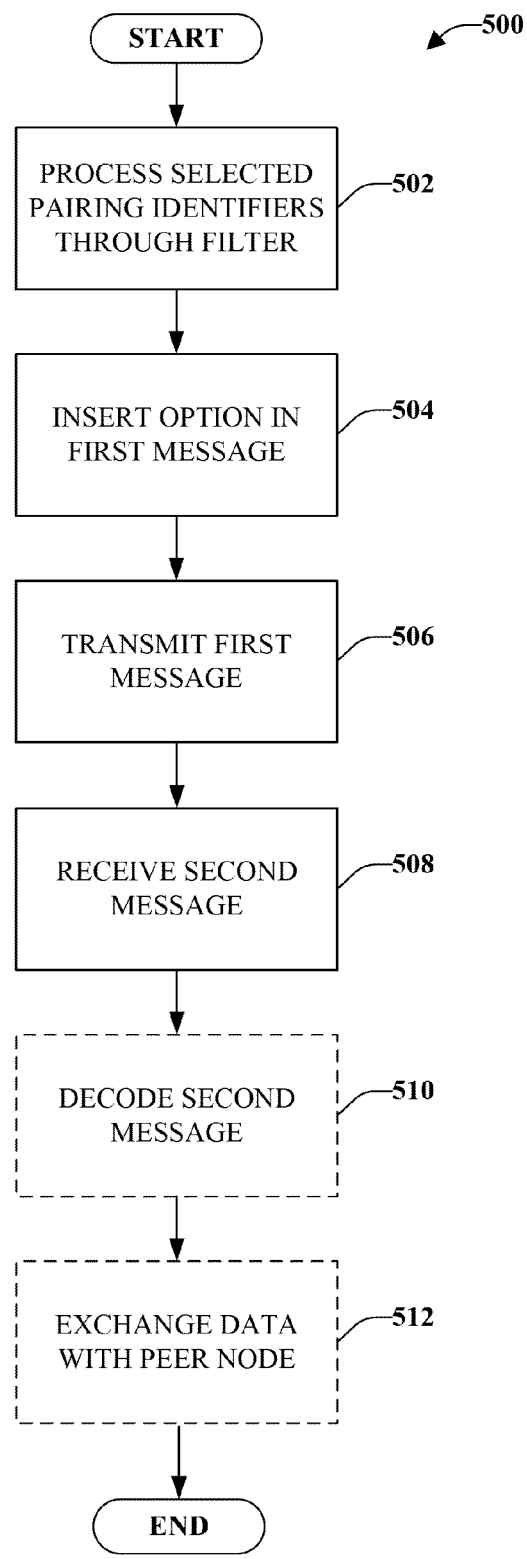
FIG. 5 illustrates a method performed by a node for discovery in a communication network.

FIG. 5 illustrates a method 500 performed by a first node for peer discovery in a communication network. At 502, at least two identifiers are processed through a filter to produce a bit vector. The at least two identifiers correspond to pairing relationships of the first node and each is a subset of a pairing (e.g., SPI-I, SPI-R). The identifiers can be selected from a plurality of identifiers (associated with first node) as a function of a filter accuracy. In accordance with some aspects, the identifiers are selected from a set of most recently used pairings. According to some aspects, the identifiers are selected from a set of most frequently used pairing. According to other aspects, the identifiers are selected based on a user input. Further, the identifiers can be selected randomly or pseudo-randomly based on a maximum number of inputs available for the filter (as a function of a maximum number of outputs). In accordance with some aspects, the filter is a Bloom filter. At 504, the bit vector is inserted in a first message and the first message is transmitted to a peer node, at 506. At 508, a second message is received from peer node. Second message includes a packet and indicates an identifier of peer node that is matched to one of the identifiers of first node.

In accordance with some aspects, method 500 can continue, at 510, and second message is decoded. According to some aspects, second message includes an unencrypted portion that includes the identifier of first node and an encrypted portion that includes the matched identifier of second node. Alternatively, the unencrypted portion can include the matched identifier of second node and the encrypted portion can include the identifier of first node.

Decoding of second message can include utilizing a security association key that corresponds to the matched identifier and the identifier selected by first node and verifying the encrypted pairing identifier corresponds to the security association. The security association is referred to by the unencrypted pairing identifier or pair of identifiers. If second message is decoded successfully, data exchange can occur with peer node, at 512.

In accordance with some aspects, second message includes a request to create a secure link. The request is sent if pairing identifiers of peer node did not match at least one of the selected identifiers indicated in the bit vector. According to some aspects, a paging request/response exchange occurs with peer node before processing the at least two selected identifiers though the filter.

Figure 6:
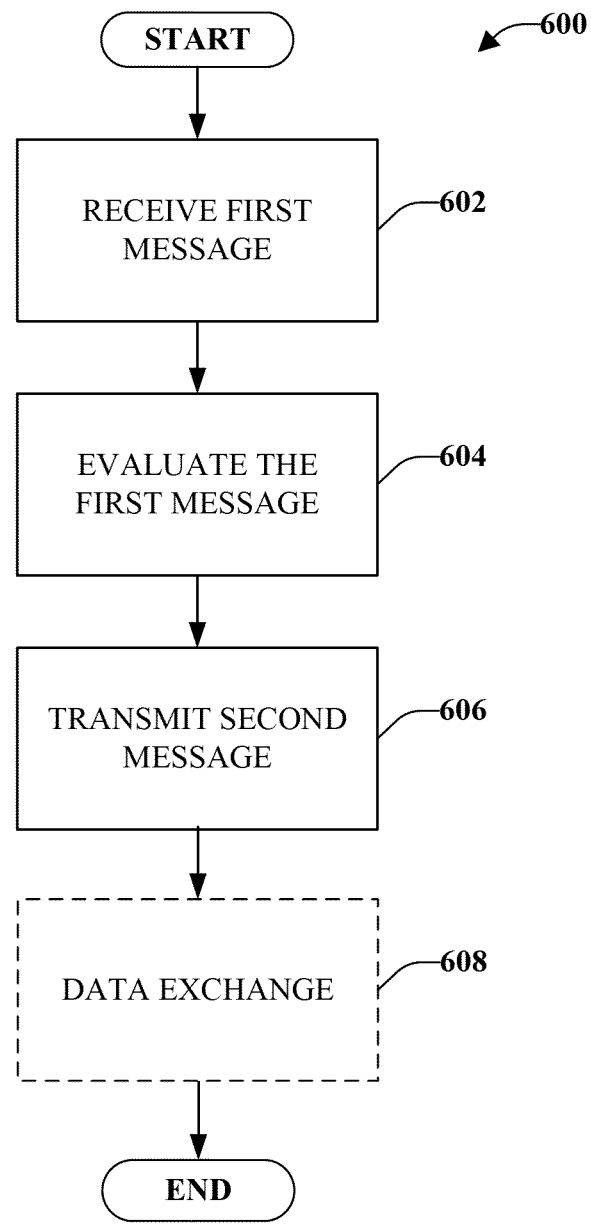
FIG. 6 illustrates a method performed by a communication device for identifying a preexisting pairing relationship.

FIG. 6 illustrates a method 600 performed by a communication device for identifying a preexisting pairing relationship. At 602, a first message is received from a peer node. The first message includes a bit vector that indicates identifiers associated with pairing relationships of peer node. In accordance with some aspects, the bit vector is an output of a Bloom filter and the input of the Bloom filter is a subset of the identifiers associated with pairing relationships of peer node.

At 604, the first message is evaluated. The evaluation includes analyzing the bit vector against a plurality of identifiers of communication device to ascertain if an identifier matches one of the identifiers indicated in the bit vector. In accordance with some aspects, the evaluation can include identifying bits in the bit vector that would be activated if one of the identifiers selected by peer node matches an identifier of communication device. A determination is made whether there is a match between a selected identifier and one of the matched identifiers (of communication device) if the identified bits are activated.

Based on the evaluation, at 606, a second message is transmitted to peer node. The second message can include the matched identifier and the selected identifier (represented in bit vector). In accordance with some aspects, method 600 can continue, at 608, when data is exchanged with peer node.

Figure 7:
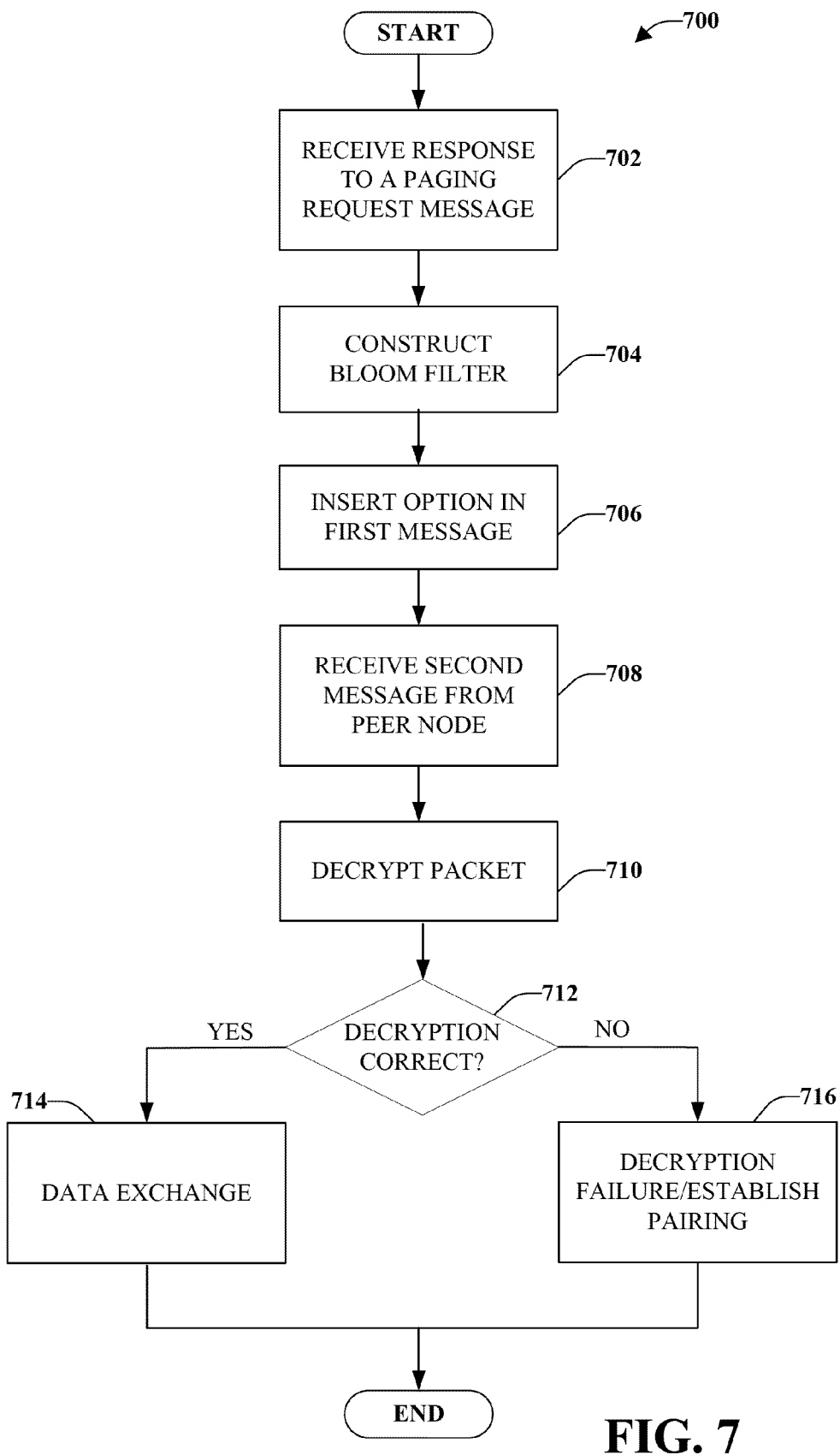
FIG. 7 illustrates a method for performing discovery between connected peers, according to an aspect.

FIG. 7 illustrates a method 700 for performing discovery between connected peers, according to an aspect. For purposes of explanation, method 700 is based on the fact that two nodes have already established a pairing.

Method 700 starts, at 702, when a paging response message is received from a peer node. The paging response message is a reply to a paging request message sent to peer node. At 704, a Bloom filter is constructed from a pool of pairing identifiers. The Bloom filter is constructed because the identity of peer node might not be apparent based on the paging response message. Depending on the filter accuracy (e.g., false positive rate), the Bloom filter might be constructed with a subset of pairing identifiers. In accordance with some aspects, the Bloom Filter is constructed with the most recent (created or used) pairing identifiers. According to other aspects, the Bloom Filter is constructed with the active pairing identifiers (e.g., where a child SA is still valid). Further, the pairing identifiers might be selected based on a maximum number of filter inputs.

At 706, the Bloom Filter is inserted in a first message (e.g., a Layer 2 Key Establishment) and the first message is sent to peer device. At 708, a second message is received from peer node. The second message is sent by peer node if any of peer node's security parameter indexes is a member of the Bloom Filter. The second message carries a security parameter index as reference to a corresponding security association. Further, the second message includes a corresponding security parameter index, which can be included in the encrypted part of the signaling message.

If the second message carries a valid security parameter index, at 710, the packet is decrypted using the corresponding security association key. The decryption allows for a second verification whether the decrypted security parameter index corresponds to the correct security association, which is also referred to by the unencrypted security parameter index. A determination is made at 712, whether the decryption was correct or not correct. If the decrypted security parameter index is valid, the decryption is correct ("YES"), and data exchange can immediately start, at 714. In the situation where the security parameter index is a false positive, the security parameter index will be decrypted incorrectly ("NO") and, therefore, at 716 the second message will be discarded and a new pairing will be established.

Figure 8:
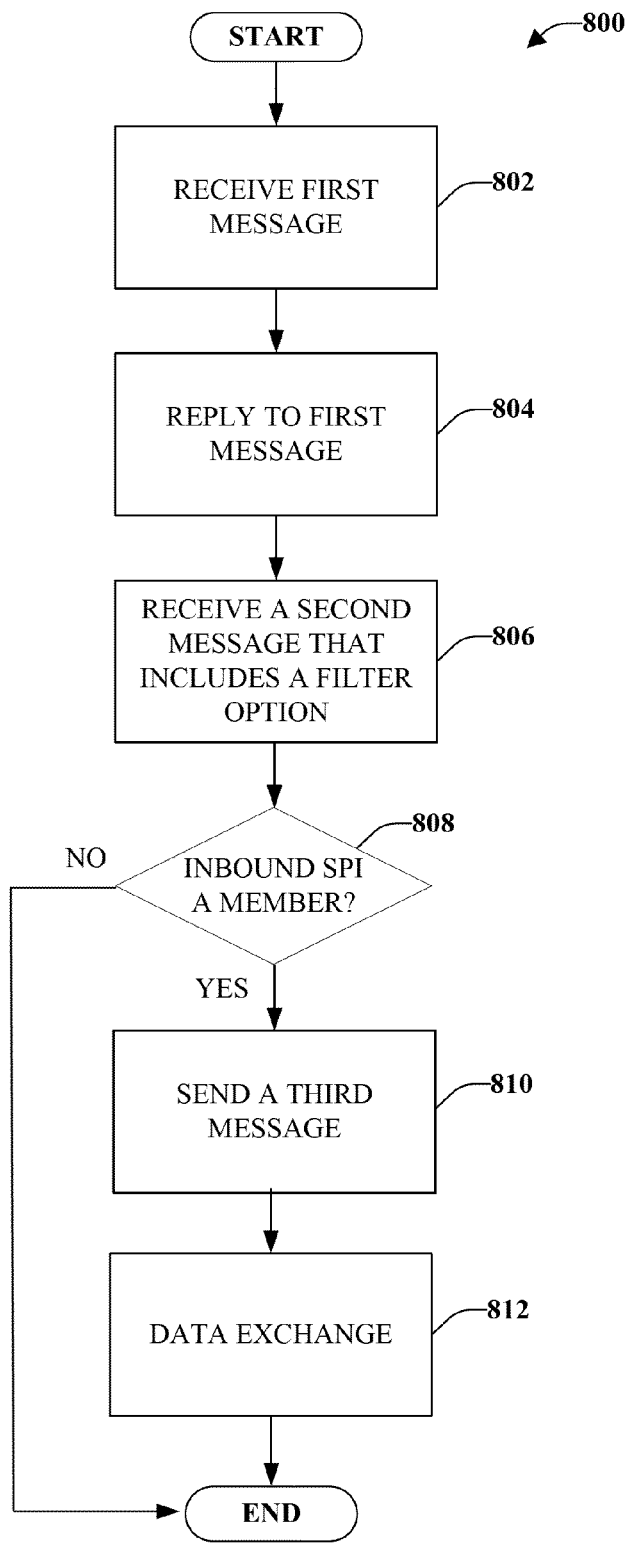
FIG. 8 illustrates a method for selectively identifying an established pairing with a node, according to an aspect.

With reference now to FIG. 8, illustrated is a method 800 for selectively identifying an established pairing with a node, according to an aspect. At 802, a first message is received from a peer node. The first message can be a paging request message. A reply to first message is sent to peer node, at 804. A second message is received, at 806. The second message can include a Bloom Filter as an option. Based on second message, at 808, a determination is made whether any known SPIs is a member of the Bloom Filter. If a member is found ("YES"), at 810, a third message is sent to peer node. Third message can carry an security parameter index as a reference to the corresponding security association. The corresponding security parameter index can be inserted in the encrypted portion of the third message (or, in some aspects, in the unencrypted portion). Third message can be a signaling message. The encryption can be performed utilizing the corresponding security association key. If peer node confirms the association, data exchange can be conducted, at 812.

If the determination, at 808, is that a security parameter index member is not found ("NO") method 800 can end. The devices can continue with establishment of a new pairing.

Figure 9:
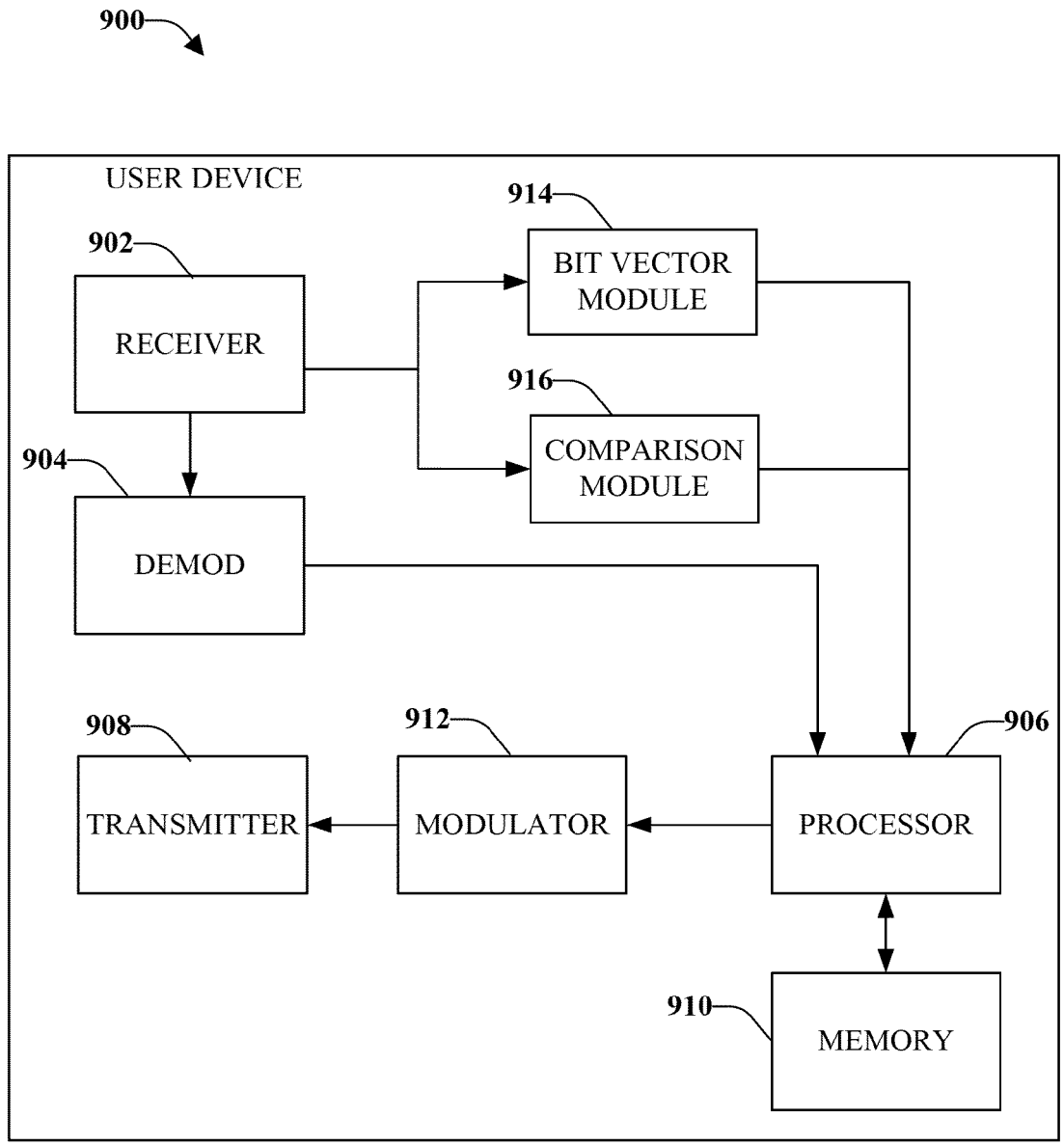
FIG. 9 illustrates a system that facilitates discovery in a peer-to-peer communication network, in accordance with one or more of the disclosed aspects.

FIG. 9 illustrates a system 900 that facilitates discovery in a peer-to-peer communication network, in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with peer discovery. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

User device 900 also includes a bit vector module 914 and a comparison module 916. According to some aspects, bit vector module 914 is configured to construct a bit vector that indicates selected pairing identifiers that might be associated with preestablished pairing relationships of a peer device. If one of the selected pairing identifiers is known by peer device, it indicates that a previous communication pairing between the devices was established. The previous pairing can be utilized for a current data exchange. If there was not a previous pairing, a new pairing between the devices can be initiated. In accordance with some aspects, comparison module 916 is utilized to determine whether any pairing identifiers indicated in the bit vector received from another device match known pairing identifiers. If there is a match, it indicates that a previous pairing can be utilized to exchange data. If there is no match found, it indicates that a new pairing will need to be established in order to exchange data.

Figure 10:
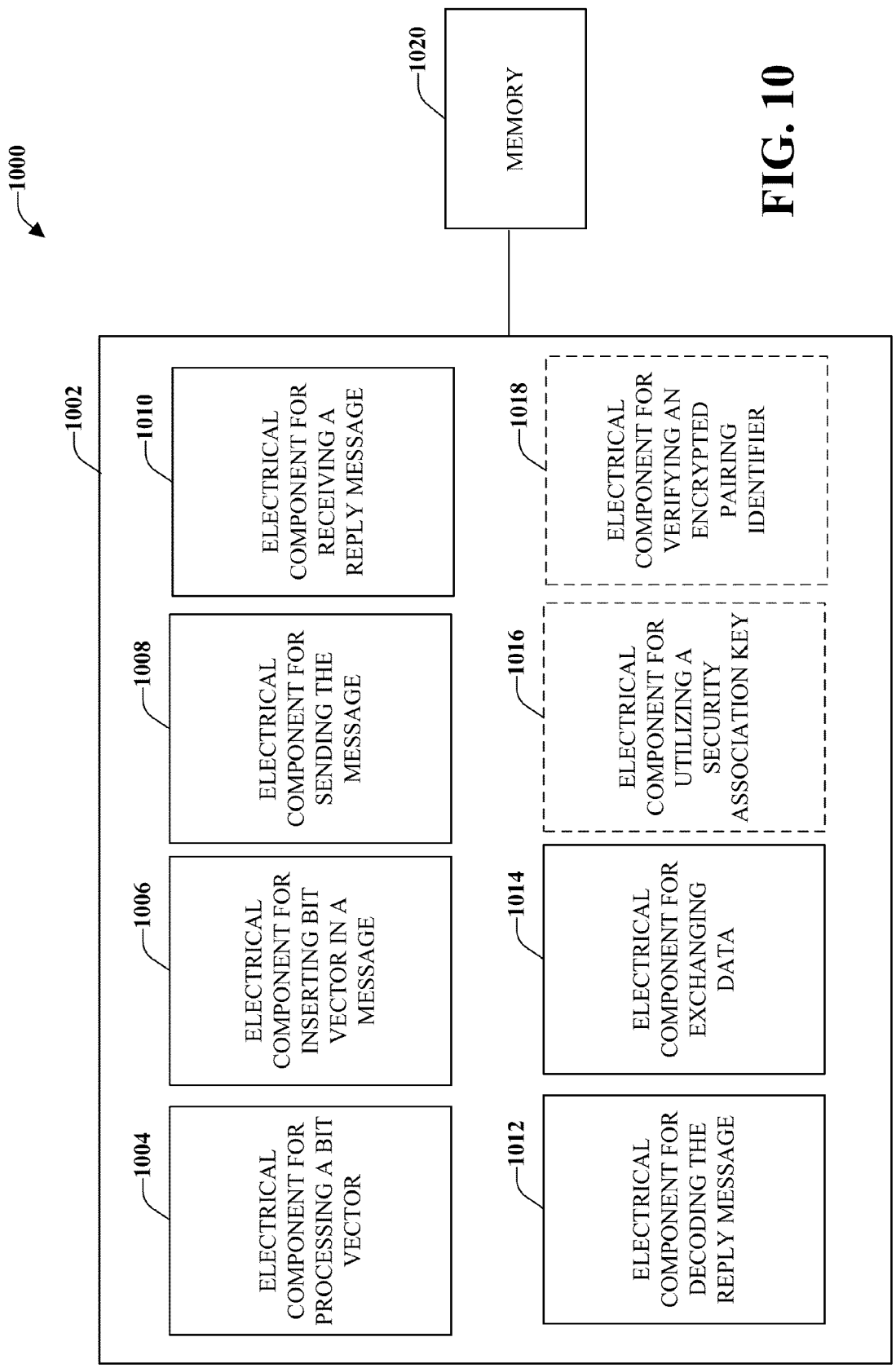
FIG. 10 illustrates an example system that processes known pairing identifiers through a filter mechanism to facilitate discovery in an ad hoc environment, according to an aspect.

FIG. 10 illustrates an example system 1000 that processes known pairing identifiers through a filter mechanism to facilitate peer discovery in an ad hoc environment, according to an aspect. For example, system 1000 may reside at least partially within a mobile device. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 includes an electrical component 1004 for processing a subset of selected identifiers through one or more hash operations to produce a bit vector. Each selected identifier is known by user device and is a subset of a pairing of a pairing identifier (e.g., part of a preexisting pairing relationship). Also included are an electrical component 1006 for inserting the bit vector in a first message and an electrical component 1008 for transmitting first message to a peer node. Further, logical grouping 1002 includes an electrical component 1010 for receiving from peer node a second message that includes a packet. Second message can indicate an identifier of peer node that corresponds to one of the selected pairing identifiers indicated in the bit vector. Also included is an electrical component 1012 for decoding the packet and an electrical component 1014 for exchanging data with peer node if the packet decoded successfully.

If the packet is not decoded successfully, a new pairing is established with peer node. According to some aspects, second message includes a request to create a secure link if no identifiers of peer node matched at least one of the selected identifiers indicated in the bit vector.

In accordance with some aspects, second (or reply) message includes an unencrypted portion and an encrypted portion. The unencrypted portion can include the selected identifier and the encrypted portion can include the matched identifier. Logical grouping 1002 includes an electrical component 1016 for utilizing a security association key that corresponds to the matched identifier and the selected identifier and an electrical component 1018 for verifying the encrypted pairing identifier corresponds to the security association. The security association is referred to by the pairing (e.g., security association). Data exchange occurs if the pairing is valid (e.g., matches an identifier in the local database of pairings and whose associated key was used to decrypt the identifier). According to some aspects, an unencrypted portion of second message includes the matched identifier and the encrypted portion includes the selected identifier.

Additionally, system 1000 can include a memory 1020 that retains instructions for executing functions associated with electrical components 1004, 1006, 1008, 1010, 1012, 1014, 1016, and 1018 or other components. While shown as being external to memory 1020, it is to be understood that one or more of electrical components 1004, 1006, 1008, 1010, 1012, 1014, 1016, and 1018 may exist within memory 1020.

Figure 11:
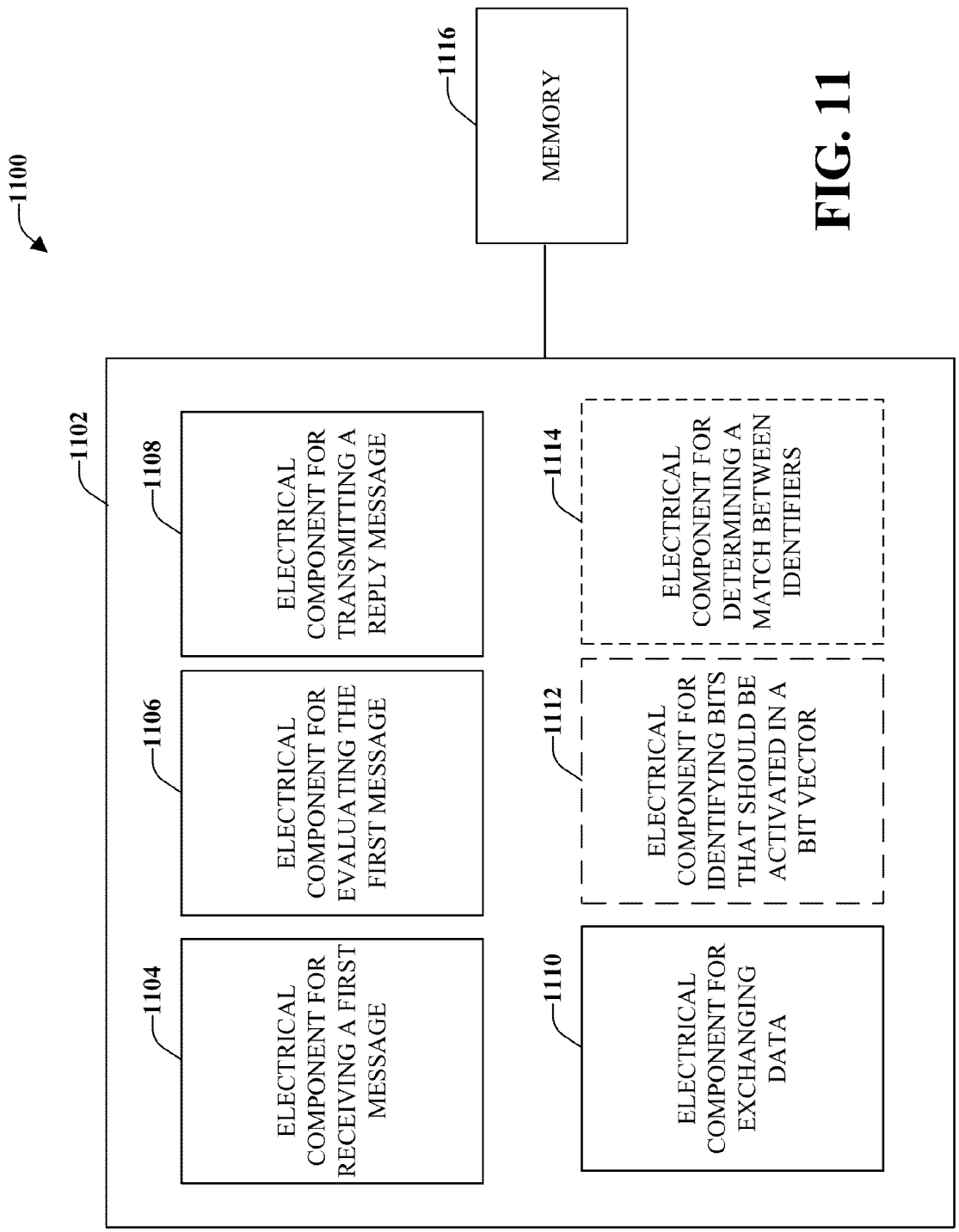
FIG. 11 illustrates an example system that performs discovery in a peer-to-peer communication network as a function of a bit vector that represents known pairing identifiers, according to an aspect.

FIG. 11 illustrates an example system 1100 that performs discovery in a peer-to-peer communication network as a function of known pairing identifiers processed through a filter mechanism, according to an aspect. System 1100 may reside at least partially within a mobile device. System 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 includes an electrical component 1104 for receiving from a peer node a first message that comprises a bit vector. The bit vector indicates at least one identifier associated with one or more pairing relationships established with peer node. The bit vector can be an output of a Bloom filter and the input of the Bloom filter is a subset of the identifiers selected by peer node.

Also included in logical grouping 1102 is an electrical component 1106 for evaluating first message against a plurality of identifiers associated with pairing relationships of user device to ascertain if one of the user device identifiers matches one of the identifiers indicated in the bit vector. Further, logical grouping 1102 includes an electrical component 1108 for transmitting to peer node a second message that includes the matched user device identifier and peer node identifier and an electrical component 1110 for exchanging data with peer node. Peer node identifier can be inserted in an encrypted portion of the second message. However, in accordance with some aspects, peer node identifier can be inserted in an unencrypted portion of second message.

Alternatively or additionally, logical grouping 1102 includes an electrical component 1112 for identifying bits in the bit vector that would be activated if one of peer node identifiers matches one of the user device identifiers. Also included is an electrical component 1114 for determining there is a match between a user device identifier and one of peer node identifiers if the identified bits are activated.

For example, an SPI pair is SPI-T, SPI-R. One device selected SPI-T, which was included in the Bloom filter and sent to peer device. Peer device that utilizes system 1100 evaluates a list of SPI that its peers choose and determines if there is a match to SPI-I. In this case, it will find SPI-I and its match, SPI-R. Thus, device that utilizes system 100 can retrieve the associated key and send back SPI-I, unencrypted, and SPI-R, encrypted, for example. First node receives SPI-I and searches for local copy of SPI-R. To check, peer node retrieves its local key (same as device that utilizes system 100) and decrypts the encrypted quantity. If SPI-R is decrypted (e.g., matches the local copy of it), there is a pairing.

Additionally, system 1100 can include a memory 1116 that retains instructions for executing functions associated with electrical components 1104, 1106, 1108, 1110, 1112, and 1114 or other components. While shown as being external to memory 1116, it is to be understood that one or more of electrical components 1104, 1106, 1108, 1110, 1112, and 1114 may exist within memory 1116.

Figure 12:
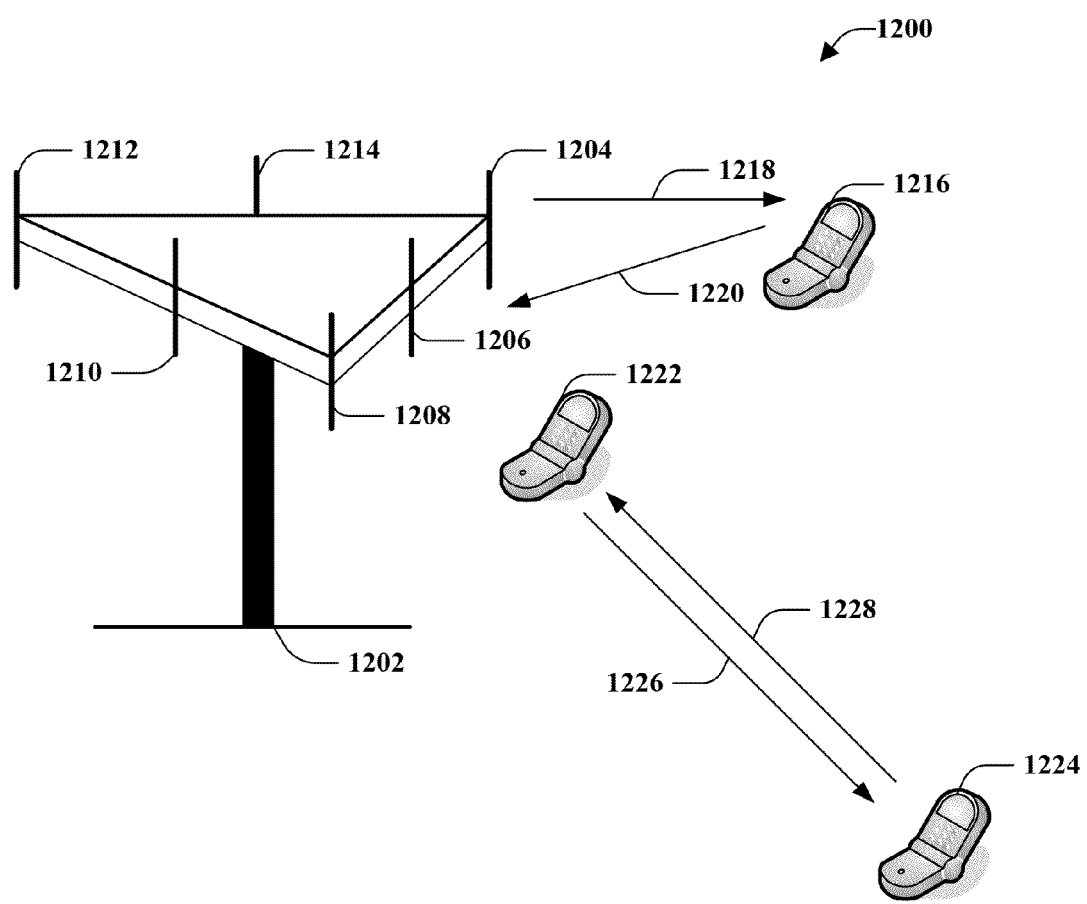
FIG. 12 illustrates a wireless communication system in accordance with various aspects

Referring now to FIG. 12, illustrated is a wireless communication system 1200 in accordance with various aspects. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1202 can be a home base station, a Femto base station, and/or the like.

Base station 1202 can communicate with one or more devices such as device 1216; however, it is to be appreciated that base station 1202 can communicate with substantially any number of devices similar to device 1216. As depicted, device 1216 is in communication with antennas 1204 and 1206, where antennas 1204 and 1206 transmit information to device 1216 over a forward link 1218 and receive information from device 1216 over a reverse link 1220. In a frequency division duplex (FDD) system, forward link 1218 can utilize a different frequency band than that used by reverse link 1220, for example. Further, in a time division duplex (TDD) system, forward link 1218 and reverse link 1220 can utilize a common frequency band.

In addition, devices 1222 and 1224 can be communicating with one another, such as in a peer-to-peer configuration. Moreover, device 1222 is in communication with device 1224 using links 1226 and 1228. In a peer-to-peer ad hoc network, devices within range of each other, such as devices 1222 and 1224, communicate directly with each other without a base station 1202 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 13:
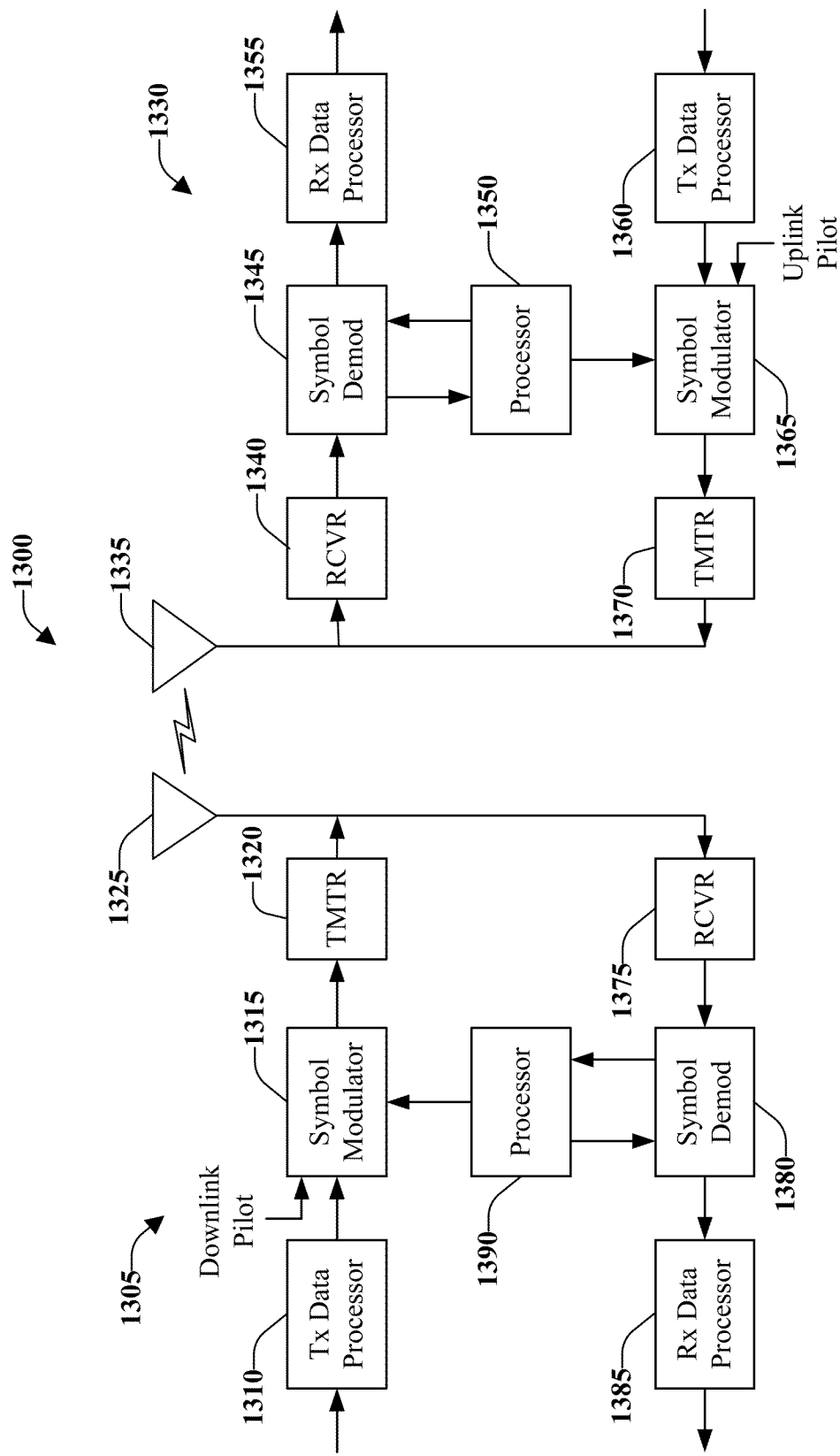
FIG. 13 illustrates an exemplary wireless communication system, according to an aspect.

FIG. 13 illustrates an exemplary wireless communication system 1300, according to various aspects. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, . . . ) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a first peer node in a communication network, comprising:

filtering, via a hardware-based processor of the first peer node, a plurality of selected identifiers through a Bloom filter to produce a bit vector, the plurality of selected identifiers being a subset of pairing identifiers that identify a subset of previously established pairing relationships between the first peer node and other peer nodes, each pairing identifier of the subset based on a unique identifier selected by the first peer node and another unique identifier selected by a respective one of the other peer nodes;

inserting, into a first message, the bit vector produced by the Bloom filter;

transmitting, via a transmitter of the first peer node, the first message to a second peer node of the communication network; and receiving, via a receiver of the first peer node, second message from the second peer node, the second message comprising a packet and indicating a match to one of the plurality of selected identifiers, the match representing a potential pairing relationship between the first peer node and the second peer node.

2. The method of claim 1, wherein the first peer node and the second peer node previously established a pairing that is identifiable by one of the plurality of selected identifiers included in the bit vector.

3. The method of claim 1, further comprising:
attempting to decode the packet received from the second peer node; and
if the attempt to decode the packet is unsuccessful, establishing a new pairing with the second peer node of the communication network.

4. The method of claim 1, wherein the second message includes a request to create a secure link if the second peer node was unable to match at least one of the plurality of selected identifiers indicated in the bit vector.

5. The method of claim 4, wherein the first peer node and the second peer node did not previously establish a pairing.

6. The method of claim 1, wherein the second message comprises an unencrypted portion and an encrypted portion, the unencrypted portion comprises the unique identifier selected by the first peer node and the encrypted portion comprises the other unique identifier selected by the second peer node, the method further comprising:
selecting a security association key that corresponds to the unique identifier selected by the first peer node and the other unique identifier selected by the second peer node;
decoding, via the security association key, the encrypted portion of the second message; and
verifying that the encrypted portion corresponds to the security association.

7. The method of claim 1, wherein the second message comprises an unencrypted portion and an encrypted portion, the encrypted portion comprises the unique identifier selected by the first peer node and the unencrypted portion comprises the other unique identifier selected by the second peer node.

8. The method of claim 1, wherein a paging request and response exchange occurs between the first peer node and the second peer node before the act of filtering the plurality of selected identifiers is performed.

9. The method of claim 1, further comprising selecting the plurality of selected identifiers as a function of the Bloom filter's accuracy.

10. The method of claim 1, wherein the plurality of selected identifiers are selected from a set of most recently used pairings between the first peer node and other peer nodes.

11. The method of claim 1, wherein the plurality of selected identifiers are selected from a set of most frequently used pairings between the first peer node and other peer nodes.

12. The method of claim 1, wherein the plurality of selected identifiers are selected based on user input.

13. The method of claim 1, wherein the Bloom filter is configured to provide bit vectors with a bit length that ranges from 128 bits to 256 bits.

14. A communications apparatus, comprising:
a processor implemented at least partially in hardware;
a memory storing processor-executable instructions that, responsive to execution by the processor, cause the processor to implement operations comprising:
filtering a subset of pairing identifiers through a Bloom filter to obtain a bit vector, the subset of pairing identifiers identifying a subset of previously established pairing relationships between the communications apparatus and peer nodes of a communication network, each pairing identifier of the subset based on a unique identifier selected by the communications apparatus and another unique identifier selected by a respective one of the peer nodes;
sending, to one of the peer nodes, the bit vector in a message; and
receiving, from the peer node, a reply message that includes a packet and a pairing identifier that corresponds to one of the subset of pairing identifiers indicated in the bit vector.

15. The communications apparatus of claim 14, wherein a previous pairing was established between the communications apparatus and the peer node of the communication network.

16. The communications apparatus of claim 14, wherein the reply message includes a request to create a secure link for a new pairing if at least one of the pairing identifiers indicated in the bit vector did not match a pairing identifier recognized by the peer node.

17. The communications apparatus of claim 14, wherein the operations further comprise selecting the subset of pairing identifiers from a plurality of pairing identifiers as a function of an allowable false positive rate for the Bloom filter.

18. The communications apparatus of claim 14, wherein the subset of pairing identifiers is selected from a set of most recently used-pairing relationships of the communications apparatus, from a set of most frequently used pairing relationships of the communications apparatus, or based on user input.

19. The communication apparatus of claim 14, wherein the reply message comprises an unencrypted portion and an encrypted portion, the unencrypted portion comprises the pairing identifier that corresponds to the one of the subset of pairing identifiers indicated in the bit vector, the encrypted portion comprises the one of the subset of pairing identifiers indicated in the bit vector, and the operations implemented by the processor further comprise:
decoding the packet with a security association key associated with the pairing identifier that corresponds to the one of the subset of pairing identifiers indicated in the bit vector and the pairing identifier indicated in the bit vector; and
verifying that the encrypted pairing identifier is related to the security association, the security association referred to by the pairing identifier in the unencrypted portion of the reply message.

20. The communications apparatus of claim 19, wherein the encrypted portion of the reply received from the peer node further comprises a time stamp.

21. A communication apparatus for discovering peer nodes of an ad hoc network, comprising:
means for filtering a subset of pairing identifiers through a Bloom filter mechanism that outputs a bit vector, wherein marked bits of the bit vector correspond to the subset of pairing identifiers that identify a subset of previously established pairing relationship between the communications apparatus and the peer nodes of the ad hoc network, each pairing identifier of the subset based on a unique identifier selected by the communication apparatus and another unique identifier selected by a respective one of the peer nodes;
means for transmitting, to one of the peer nodes, a first message that includes the bit vector; and
means for receiving, from the peer node, a second message that includes one of the pairing identifiers in the subset of pairing identifiers and a corresponding pairing identifier.

22. The communication apparatus of claim 21, wherein the communication apparatus and the peer node established a pairing before transmission of the first message.

23. The communication apparatus of claim 21, further comprising:
  means for decrypting the packet utilizing a security association that is referred to by the second message; and
  means for establishing a pairing with the peer node if the packet is not decrypted successfully.

24. The communication apparatus of claim 21, further comprising means for establishing a pairing if the second message includes a request to create a secure link, the request indicating that pairing identifiers retained by the peer node do not correspond to the pairing identifiers indicated in the bit vector.

25. One or more non-transitory computer-readable media storing processor executable instructions that, responsive to execution by a processor, implement operations comprising:
  filtering a plurality of pairing identifiers through a Bloom filter to produce a bit vector, the plurality of pairing identifiers identifying a subset of previously established pairing relationship between a first peer node and other peer nodes of a communication network, each pairing identifier of the plurality based on a unique identifier selected by the first peer node and another unique identifier selected by a respective one of the other peer nodes;
  inserting, into a first message, the bit vector produced through the Bloom filter;
  transmitting the first message to a second peer node of the communication network; and
  receiving, from the second peer node, a second message comprising a packet that indicates a match to one of the plurality of pairing identifiers represented by the bit vector.

26. The one or more non-transitory computer-readable media of claim 25, wherein a pairing was previously established between the first peer node and the second peer node and the operations further comprise:
  decoding the packet; and
  exchanging data with the second peer node if the packet is decoded successfully.

27. At least one processor configured to implement a filter mechanism, comprising:
  a first module for filtering a subset of pairing identifiers through a Bloom filtering mechanism to obtain a bit vector, the subset of pairing identifiers identifying a subset of previously established pairing relationships between a first peer node and other peer nodes of a communication network, each pairing identifier of the subset based on a unique identifier selected by the first peer node and another unique identifier selected by a respective one of the other peer nodes;
  a second module for transmitting, to a second peer node, a message that includes the bit vector obtained from the Bloom filtering mechanism;
  a third module for receiving, from the second peer node, a reply that includes a packet and an identifier that corresponds to one of the subset of pairing identifiers included in the bit vector; and
  a fourth module for exchanging data with the second peer node if the packet is successfully decoded.

28. The at least one processor of claim 27, wherein a paging request and response exchange occurs between the first peer node and the second peer node before the first module filters the subset of pairing identifiers.

29. A method performed by a communication device for identifying a preexisting pairing relationship, comprising:
  receiving, via a receiver of the communication device, and from a peer node, a first message that comprises a bit vector provided by a Bloom filter, wherein the bit vector indicates a plurality of peer node pairing identifiers that identify a subset of previously established pairing relationships between the peer node and other peer nodes, each pairing identifier of the plurality based on a unique identifier selected by the peer node and another unique identifier selected by a respective one of the other peer nodes;
  evaluating, via a processor of the communication device, the first message against a plurality of communication device pairing identifiers associated with pairing relationships of the communication device to ascertain if one of the communication device pairing identifiers matches one of the peer node pairing identifiers received in the bit vector; and
  transmitting, via a transmitter of the communication device and to the peer node, a second message that includes a matched communication device pairing identifier and a peer node pairing identifier received in the bit vector.

30. The method of claim 29, further comprising inserting the matched communication device pairing identifier in an encrypted or unencrypted portion of the second message.

31. The method of claim 29, further comprising:
  identifying bits in the bit vector that would be activated if one of the plurality of peer node pairing identifiers received in the bit vector matches a communication device pairing identifier associated with a pairing relationship of the communication device; and
  determining a match between the communication device pairing identifier and one of the plurality of peer node pairing identifiers if the identified bits are activated in the bit vector.

32. The method of claim 29, wherein the bit vector has a bit length that ranges from 128 bits to 256 bits.

33. The method of claim 29, wherein a paging request and response exchange occurs between the communication device and the peer node before the communication device receives the first message.

34. The method of claim 29, wherein the communication device and the peer node have a previously established pairing relationship before the first message is received by the communication device.

35. The method of claim 29, further comprising establishing a pairing between the communication device and the peer node if the evaluation does not produce a match between one of the plurality of peer node pairing identifiers and one of the plurality of communication device pairing identifiers.

36. The method of claim 29, wherein a match is not found between one of the plurality of communication device pairing identifiers and one of the plurality of peer node pairing identifiers if the communication device and the peer node did not previously establish a pairing relationship.

37. A communication apparatus, comprising:
  a processor implemented at least partially in hardware;
  a memory storing processor-executable instructions that responsive to execution by the processor, cause the processor to implement operations comprising:
    receiving, from a peer node, a message that includes a bit vector provided by a Bloom filter, the bit vector indicating a plurality of pairing identifiers that identify a subset of previously established pairing relationships between the peer node and other peer nodes, each pairing identifier of the plurality based on a unique identifier selected by the peer node and another unique identifier selected by a respective one of the other peer nodes;

determining which bits in the bit vector would be activated if the message included one of a plurality of pairing identifiers known by the communication apparatus;

matching activated bits to a pairing identifier known by the communication apparatus;

transmitting, to the peer node, a reply message that includes a matched pairing identifier if the bits were activated; and exchanging data with the peer node if the activated bits match the pairing identifier known by the communication apparatus.

38. The communication apparatus of claim 37, wherein the bit vector has a bit length ranging from 128 bits to 256 bits.

39. The communication apparatus of claim 37, wherein a paging request and response exchange occurs between the communication apparatus and the peer node before the first message is received.

40. The communication apparatus of claim 37, wherein the operations further comprise establishing a new pairing with the peer node if the activated bits are not matched to at least one of the plurality of pairing identifiers known by the communication apparatus.

41. The communication apparatus of claim 37, wherein the communication apparatus and the peer node have an existing pairing relationship before the message that includes the bit vector is received.

42. A communications apparatus that implements a bit vector for peer discovery, comprising:

means for receiving, from a peer node, a first message that includes a bit vector provided by a Bloom filter, the bit vector indicating pairing identifiers of the peer node, the pairing identifiers identifying a subset of previously established pairing relationships between the peer node and other peer nodes, each of the pairing identifiers based on a unique identifier selected by the peer node and another unique identifier selected by a respective one of the other peer nodes;

means for identifying bits that should be activated in the bit vector if one of the pairing identifiers matches one of a plurality of pairing identifiers known by communications apparatus;

means for determining a match between one of the pairing identifiers indicated in the bit vector and one of the plurality of pairing identifiers known by the communications apparatus;

means for transmitting, to the peer node, a second message that includes the one of the pairing identifiers indicated in the bit vector and the one of the plurality of pairing identifiers known by the communication device; and means for exchanging data with the peer node if one of the pairing identifiers indicated in the bit vector matches one of the plurality of pairing identifiers known by the communications apparatus.

43. The communications apparatus of claim 42, wherein a paging request and response exchange occurs between the communications apparatus and the peer node before the first message is received.

44. The communications apparatus of claim 42, wherein the communications apparatus further comprises means for establishing a new pairing with the peer node if there is not a match between one of the pairing identifiers indicated in the bit vector and one of the plurality of pairing identifiers known by communications apparatus.

45. The communications apparatus of claim 42, wherein a pairing relationship was previously established between the communications apparatus and the peer node.

46. One or more non-transitory computer-readable media storing processor executable instructions that, responsive to execution by a processor, implement operations comprising:

receiving, from a peer node, a first message that comprises a bit vector provided by a Bloom filter, wherein the bit vector indicates pairing identifiers that identify a subset of previously established pairing relationships between the peer node and other peer nodes, each of the pairing identifiers based on a unique identifier selected by the peer node and another unique identifier selected by a respective one of the other peer nodes;

evaluating the bit vector of the first message against a plurality of known pairing identifiers to ascertain if a known pairing identifier matches one of the pairing identifiers indicated in the bit vector;

transmitting, to the peer node, a second message that includes a matched known pairing identifier and the pairing identifier indicated in the bit vector; and exchanging, responsive to matching the known pairing identifier, data with the peer node.

47. The one or more non-transitory computer-readable media of claim 46, wherein the operations further comprise exchanging a paging request and a paging response before the first message is received.

48. At least one processor of a first peer node, the at least one processor configured to perform discovery in a peer-to-peer communication network, comprising:

a first module for receiving, from a second peer node, a message that includes a bit vector provided by a Bloom filter, the bit vector indicating a pairing identifiers that identify a subset of previously established pairing relationships between the second peer node and other peer nodes, each of the pairing identifiers based on a unique identifier selected by the second peer node and another unique identifier selected by a respective one of the other peer nodes;

a second module for determining which bits in the bit vector would be activated if the message included a pairing identifier that identifies a previously established pairing relationship between the first peer node and the second peer node;

a third module for matching the set bits to pairing identifiers known by the first peer node;

a fourth module for transmitting, to the second peer node, a reply message that includes a matched known pairing identifier if the bits were activated; and a fifth module for exchanging, in response to matching a known pairing identifier, data with the second peer node.

49. The at least one processor of claim 48, wherein there is a previously established pairing relationship between the first peer node and the second peer node.

* * * * *